US012762872B1

(12) United States Patent
Raslambekov

(10) Patent No.: US 12,762,872 B1
(45) Date of Patent: Oct. 13, 2026

(54) SYSTEMS AND METHODS FOR IDENTIFYING A SUBJECT'S TEETH IN IMAGE DATA

(71) Applicant: Oxilio Ltd, Larnaca (CY)

(72) Inventor: Islam Khasanovich Raslambekov, Long Island City, NY (US)

(73) Assignee: OXILIO LTD, Larnaca (CY)

( * ) Notice: Subject to any disclaimer, the term of this patent is extended or adjusted under 35 U.S.C. 154(b) by 0 days.

(21) Appl. No.: 19/377,414

(22) Filed: Nov. 3, 2025

(51) Int. Cl.

| | |
|---|---|
| ***G06V 20/64*** | (2022.01) |
| ***A61C 7/00*** | (2006.01) |
| ***G06T 19/20*** | (2011.01) |
| ***G06V 10/26*** | (2022.01) |
| ***G06V 10/44*** | (2022.01) |
| ***G06V 10/774*** | (2022.01) |
| ***G06V 10/82*** | (2022.01) |

(52) U.S. Cl.
CPC .............. *G06V 20/64* (2022.01); *A61C 7/002* (2013.01); *G06T 19/20* (2013.01); *G06V 10/26* (2022.01); *G06V 10/44* (2022.01); *G06V 10/774* (2022.01); *G06V 10/82* (2022.01); *G06T 2210/41* (2013.01); *G06V 2201/03* (2022.01)

(58) Field of Classification Search
CPC ........ G06V 20/64; G06V 10/82; G06V 10/44; G06V 10/26; G06V 10/774; G06V 2201/03; A61C 7/002; G06T 19/20; G06T 2210/41
See application file for complete search history.

(56) References Cited

U.S. PATENT DOCUMENTS

| | | | |
|---|---|---|---|
| 10,950,061 | B1 | 3/2021 | Raslambekov |
| 10,993,782 | B1 | 5/2021 | Raslambekov |

(Continued)

FOREIGN PATENT DOCUMENTS

| | | | | |
|---|---|---|---|---|
| CN | 106327535 B | 11/2020 | | |
| CN | 117011318 A | * 11/2023 | | G06T 7/12 |
| CN | 118823083 A | * 10/2024 | | G06T 7/10 |

OTHER PUBLICATIONS

Sprinzl et al., "Towards Segmentation of Human Teeth Contours in Dental Radiographs Using Active Shape Models", article published on Feb. 9, 2015, https://www.prip.tuwien.ac.at/people/krw/more/papers/2015/CVWWW/Sprinzl2015a.pdf.

(Continued)

*Primary Examiner* — Gregory A Morse
*Assistant Examiner* — Rohan Tejas Mukundhan
(74) *Attorney, Agent, or Firm* — BCF LLP

(57) ABSTRACT

A method and a server for developing an orthodontic treatment plan for a subject are provided. The method comprising training a machine-learning algorithm (MLA) by: acquiring a 3D scan of an arch form of a training subject, identifying a first boundary geometry of a root portion of a given tooth by determining a contour of each cross-section of the root portion in a first anatomical plane; identifying a second boundary geometry of the root portion by determining a contour of the root portion in a projection thereof to at least one of a second and a third anatomical planes; analyzing the combination of the first and second boundary geometries to identify and remove image artefacts, thereby generating a final boundary geometry of the root portion; segmenting, in the 3D scan, the root portion of the given tooth along the generated final boundary geometry for further use in training the MLA.

17 Claims, 12 Drawing Sheets

(56) References Cited

U.S. PATENT DOCUMENTS

| | | | | |
|---|---|---|---|---|
| 11,607,296 | B1 | 3/2023 | Raslambekov et al. | |
| 12,232,923 | B2 * | 2/2025 | Anssari Moin | G16H 50/20 |
| 2021/0271225 | A1 | 9/2021 | Sirovskiy et al. | |
| 2023/0181295 | A1 | 6/2023 | Pesach et al. | |
| 2023/0181296 | A1 * | 6/2023 | Touati | A61C 8/0075 433/173 |
| 2023/0240820 | A1 | 8/2023 | Sabina et al. | |
| 2024/0325124 | A1 * | 10/2024 | Madhavji | G06V 20/70 |

OTHER PUBLICATIONS

Qian et al., “An Automatic Tooth Reconstruction Method Based on Multimodal Data”, Journal of Visualization, Sep. 2020, https://doi.org/10.1007/s12650-020-00697-0.
Ronneberger et al., “U-Net: Convolutional Networks for Biomedical Image Segmentation,” Medical Image Computing and Computer-Assisted Intervention—MICCAI 2015, published on May 18, 2015.
Milletari, “V-Net: Fully Convolutional Neural Networks for Volumetric Medical Image Segmentation,” published on arxiv.org on Jun. 15, 2016.
Oktay, “Attention U-Net: Learning Where to Look for the Pancreas” published on arxiv.org on Apr. 11, 2018.
Jha et al. “ResUNet++: An Advanced Architecture for Medical Image Segmentation”, published on arxiv.org on Nov. 16, 2019.
Chen et al. “TransUNet: Transformers Make Strong Encoders for Medical Image Segmentation”, published on arxiv.org on Feb. 8, 2021.

* cited by examiner

SYSTEMS AND METHODS FOR IDENTIFYING A SUBJECT'S TEETH IN IMAGE DATA

FIELD

The present technology relates to systems and methods for developing orthodontic treatments; and more specifically, although not exclusively, to identifying a subject's teeth in image data of different modalities.

BACKGROUND

In orthodontics, treatments for achieving alignment of malposed teeth in a subject include applying orthodontic appliances, such as orthodontic aligners, to the subject's teeth. Orthodontic aligners are typically worn over teeth of an arch form in order to exert a force to the subject's teeth to cause movements thereof to their respective target positions, typically associated with their alignment within the arch form. In another example, the orthodontic aligners can be used to retain the subject's teeth in an already achieved desired position.

The orthodontic aligners are typically custom-made to the subject's teeth, and a shape of the orthodontic aligners, among other factors, defines the effective forces to be exerted to the teeth, and the effective correction that may be attained. Certain methods of designing such an aligner may comprise obtaining a 3D representation of the arch form, and based thereon, determining the required treatment plan for the teeth requiring alignment. The treatment plan may comprise multiple sequential treatment steps, each treatment step comprising a different aligner to be worn by the subject.

Conventional techniques for generating such 3D representation include intra-oral scanning, allowing generating 3D meshes representative of external structures of the subject's arch forms, that is, crowns and gums.

However, for more effective and safe treatments, it may also be required to obtain data of the roots of the subject's teeth. Although, some of these data, such as dimensions, for example, can be obtained from reference sources including average dimensions of the roots for each of the teeth in the population, it does not allow considering individual (anatomical) specifics of each subject. Such specifics, aside from the dimensions, can include curves, individual disposition, and a number of roots in the root portion of each of the subject's teeth, and chips, to name a few.

Therefore, there is a need in the art for generating 3D models of the subject's teeth having more anatomically accurate roots. Certain prior art approaches have been proposed to tackle the above-identified technical problem.

United States Patent Application Publication No.: 2024/0325,124-A1, published on Oct. 3, 2024, assigned to Milan Madhavji, and entitled "METHOD FOR PROVIDING ANNOTATED SYNTHETIC IMAGE DATA FOR TRAINING MACHINE LEARNING MODELS," discloses a method for training a machine learning model includes the steps of generating a three-dimensional model of at least one anatomical structure, labeling data of the three-dimensional model to identify modeled substructures of the at least one anatomical structure, acquiring a plurality of two-dimensional images from the three-dimensional model, and inputting the plurality of two-dimensional images as training data to train a machine learning model to identify substructures of the at least one anatomical structure in an image.

Chinese Patent No.: 106,327,535-B, issued on Nov. 17, 2020, assigned to Suzhou Dikaier Medical Technology Co LTD, and entitled "FUSION METHOD OF TOOTH ROOT AND INTRAORAL SCANNED DENTAL CROWN OF CBCT (CONE BEAM COMPUTED TOMOGRAPHY)," discloses a fusion method of a tooth root and a tooth crown scanned in a mouth by CBCT, which comprises the following steps: obtaining a CBCT tooth model through segmentation and reconstruction; obtaining an intraoral scanning tooth model through segmentation and reconstruction; registering the CBCT tooth model crown with a crown in the intraoral scanned tooth model; separating the root and the crown in the CBCT tooth model to obtain a complete tooth root model; identifying the ordered boundary of the tooth root model and the ordered boundary of the crown model in the intraoral scanning tooth model; merging the identified ordered boundaries, and triangularizing the merged ordered boundaries; and sequentially subdividing and smoothing the triangulated ordered boundaries to obtain a mutually fused root crown model.

Chinese Patent Application Publication No.: 118,823,083-A, published on Oct. 22, 2024, assigned to Clear Medical Technology Changzhou Co LTD, and entitled "METHOD, SYSTEM AND ELECTRONIC DEVICE FOR CONTOUR MAPPING OF TOOTH TRANSVERSE, CROWN AND SAGITTAL SLICES," discloses a method and system for mapping the contour of tooth transverse, crown, and sagittal slices. Based on CBCT image data and oral scan crown and root data, the disclosed method combines CBCT images with root bone data obtained by oral scanning, and uses the processing method of transverse, crown, and sagittal slices to monitor the contour position of the tooth root in real time, ensure the safety of orthodontic tooth movement, and effectively avoid the adverse effects of the structure and function of periodontal tissues. Accurate mapping of the internal anatomical structure of the oral cavity with the CBCT image is achieved, which can help doctors and dental professionals observe the structure of teeth and adjacent bones more clearly, provide anatomical structure information in different directions and angles, and doctors can more accurately diagnose patients' oral problems and facilitate the design of more accurate treatment plans in dental treatment and surgical planning, and evaluate the progress and effect of treatment.

An article, entitled "*Towards Segmentation of Human Teeth Contours in Dental Radiographs Using Active Shape Models*," authored by Sprinzl et al., and published in the proceedings of Symposium on Statistical Shape Modelling and Applications in February 2015, discloses an "Active Shape Models" (ASM) framework for segmentation of human teeth contours in dental radiographs. ASM are flexible, statistically based models which iteratively move toward structures in images similar to those on which they were trained in advance and consist of a set of corresponding landmarks. Each landmark represents a part of the tooth's boundary to be located. The training phase of the framework incorporates noise removal, manual segmentation of training images, solving the correspondence problem, aligning the set of training images, and capturing its statistics. For image interpretation, the model of the tooth is placed into the target image. The model parameters are then iteratively adjusted to move the landmarks closer to the contour of the tooth to be segmented.

An article, entitled "*An Automatic Tooth Reconstruction Method Based on Multimodal Data*," authored by Qian et al, and published in Journal of Visualization in September 2020, discloses an automatic segmentation method for complete tooth models with both the crown and reconstructed root based on multimodal data. With the laser-scanned crown mesh and cone-beam computed tomography (CBCT) data of a patient, an improved iterative closest point algorithm and convex hull selection method are applied to obtain the initial contour and slice for segmentation. Based on the initialization, there is proposed an improved level set method with the shape prior, named LSS, to segment the root of the tooth slice by slice. After segmentation, the root model is reconstructed, which further replaces the crown part with the scanned crown model to solve the occlusal problem.

SUMMARY

It is an object of the present technology to ameliorate at least some of the inconveniences present in the prior art.

Developers of the present technology have appreciated that root portions of the subject's teeth can be more accurately and efficiently reconstructed from imaging data representative of the subject's arch forms. For example, if the imaging data includes 3D radiographic scans, such as those generated through cone-beam computed tomography (CBCT), the present method can include multiple application of a two-dimensional (2D) boundary identification model to (1) cross-sections of the root portion of a given tooth generated along one anatomical plane and (2) a projection of the root portion of the given tooth to at least one other anatomical plane associated with the subject.

By doing so, the present methods and system may allow identifying and removing image artefacts around the root portions of the subject's teeth in the imaging data, which may further allow more accurately segmenting the root portions. The segmented, more anatomically accurate 3D representation of the root portions can further be used, for example, in determining an orthodontic treatment for the subject or training a machine-learning model (MLA) for automatic identification of root portions of the teeth in other subjects.

Unlike the prior art approaches featuring the use of 3D boundary identification algorithms (such as a 3D level set algorithm) for identifying the root portions of the teeth, the multiple application of the 2D boundary identification algorithm as disclosed by the present methods and systems may require much less computational resources of a processor and hence may provide for higher efficiency in segmenting the root portions of the teeth in the 3D imaging data without loss in accuracy.

More specifically, in accordance with a first broad aspect of the present technology, there is provided a method for training a machine-learning algorithm (MLA) for identifying a subject's teeth in imaging data associated with the subject. The method comprises generating a training data set. The generating comprises: acquiring a 3D scan of a training arch form of a training subject, the training arch form having a plurality of teeth, a given tooth of the plurality of teeth having a crown portion and a root portion; defining, in the 3D scan, a plurality of slices representative of cross-sections of the training arch form that are extending in parallel to a first anatomical plane associated with the training subject; identifying, during a first surface boundary identification phase, a first boundary geometry of the root portion of the given tooth by determining, using the plurality of slices of the 3D scan, a contour of each cross-section of the root portion in the first anatomical plane associated with the training subject; identifying, during a second surface boundary identification phase, following the first surface boundary identification phase, a second boundary geometry of the root portion of the given tooth by determining a contour of the root portion in a projection of the root portion to at least one of a second and a third anatomical planes associated with the training subject; analyzing a combination of the first and second boundary geometries of the root portion to identify artefacts generated during at least one of the first and second surface boundary identification phases; removing the artefacts from the combination of the first and second boundaries geometries of the root portion to generate a final boundary geometry of the root portion of the given tooth; segmenting, in the 3D scan, the root portion of the given tooth along the generated final boundary geometry; and storing data of the segmented root portion for further use in training the MLA.

In some implementations of the method, the identifying each one of the first and second boundary geometries comprises applying a 2D boundary identification model.

In some implementations of the method, the 2D boundary identification model is a numeric 2D boundary identification model.

In some implementations of the method, prior to the identifying the first boundary geometry, the method comprises: acquiring a 3D digital model comprising a plurality of mesh elements defining a surface of crown portions of the plurality of teeth of the training subject; merging the 3D digital model with the 3D scan to generate an augmented 3D scan of the plurality of teeth; defining, in the augmented 3D scan, another plurality of slices representative of cross-sections of the training arch form that are extending in parallel to the first anatomical plane associated with the training subject; and wherein: the identifying, during the first surface boundary identification phase, the first boundary geometry comprises identifying a third boundary geometry of the crown and root portions of the given tooth by determining, using the other plurality of slices of the augmented 3D scan, a contour of each cross-section of the given tooth in the first anatomical plane associated with the training subject; the identifying, during the second surface boundary identification phase, following the first surface boundary identification phase, the second boundary geometry comprises identifying a fourth boundary geometry of the crown and root portions of the given tooth by determining, using the other plurality of slices of the augmented 3D scan, a contour of each cross-section of the given tooth in the at least one of the second and the third anatomical plane associated with the training subject, the analyzing comprises analyzing a combination of the third and fourth boundary geometries of the given tooth to identify artefacts generated during at least one of the first and second surface boundary identification phases; the removing comprises removing artefacts from the combination of the third and fourth boundaries geometries of the given tooth to generate a second final boundary geometry of the given tooth; the segmenting comprises segmenting, in the augmented 3D scan, the given tooth along the generated second final boundary geometry; and the storing comprises storing data of the segmented given tooth for further use in training the MLA.

In some implementations of the method, the merging comprises applying an Iterative Closest Point (ICP) algorithm.

In some implementations of the method, the first anatomical plane is a transverse anatomical plane, the second anatomical plane is a sagittal anatomical plane, and the third anatomical plane is a coronal anatomical plane.

In some implementations of the method, the MLA is a Convolutional Neural Network (CNN)-based MLA.

In some implementations of the method, the method further comprises training the MLA using the data of the segmented root portion; using the trained MLA to identify the subject's teeth in the imaging data; and generating, based on the identified subject's teeth, an orthodontic treatment for the subject.

In some implementations of the method, the training further comprising: generating a plurality of training digital objects, a given training digital object of which comprises a respective slice of the plurality of slices of the 3D scan including the root portion of the given tooth with the final boundary geometry applied thereon; feeding the given training digital object to the MLA, thereby causing the MLA to generate an intermediate boundary geometry around the root portion of the given tooth in the respective slice of the 3D scan; and minimizing a difference between the intermediate boundary geometry and the final boundary geometry, thereby causing the MLA to generate an in-use boundary geometry around the root portion of a given in-use tooth within a given in-use slice of an in-use 3D scan.

In some implementations of the method, the minimizing the difference comprises minimizing a respective value of a loss function.

In some implementations of the method, the method further comprising using the trained MLA for generating the in-use boundary geometry around the given in-use tooth in the imaging data, the using comprising: acquiring the in-use 3D scan of an in-use arch form of the subject, the in-use arch form having a plurality of in-use teeth including the given in-use tooth; defining, in the in-use 3D scan, a plurality of in-use slices, including the given in-use slice, representative of cross-sections that are extending in parallel to the first anatomical plane associated with the training subject; feeding the given in-use slice of the plurality of in-use slices to the MLA, thereby causing the MLA to generate the in-use boundary geometry of the root portion of the given in-use tooth; segmenting, in the in-use 3D scan, the root portion of the given in-use tooth along the generated in-use boundary geometry; and storing data of the segmented root portion of the given in-use tooth for further use determining an orthodontic treatment for the subject.

In some implementations of the method, the 3D scan is a 3D radiographic scan.

In accordance with a second broad aspect of the present technology, there is provided method for developing an orthodontic treatment plan for a subject using a machine-learning algorithm (MLA). The MLA has been trained to identify root portions of a plurality of teeth of the subject based on a training data set. The training data set has been generated by: acquiring training slices of a training 3D scan representative of cross-sections of the training arch form of the training subject that are extending in parallel to a first anatomical plane associated with the training subject, the training arch form having a plurality of training teeth, a given training tooth of the plurality of training teeth having a training crown portion and a training root portion; and analyzing boundary geometries of the training root portion of the given training tooth in (i) the first anatomical plane and (ii) at least one of a second anatomical plane and a third anatomical plane associated with the training subject to identify and remove image artefacts. The method comprises: acquiring a 3D scan representative of an arch form of the subject, the arch form having the plurality of teeth, a given tooth of the plurality of teeth having a crown portion and a root portion; defining, in the 3D scan, a plurality of slices representative of cross-sections of the arch form of the subject that are extending in parallel to the first anatomical plane associated with the subject; feeding a given slice of the plurality of slices to the MLA, thereby causing the MLA to generate a boundary geometry of the root portion of the given tooth; segmenting, in the 3D scan, the root portion of the given tooth along the generated boundary geometry; and generating the orthodontic treatment plan for the subject using data of the segmented root portion of the given tooth.

In some implementations of the method, the analyzing comprises: identifying, during a first surface boundary identification phase, a first boundary geometry of the training root portion of the given training tooth by determining, using the training slices of the training 3D scan, a contour of each cross-section of the training root portion in the first anatomical plane associated with the training subject; identifying, during a second surface boundary identification phase, following the first surface boundary identification phase, a second boundary geometry of the training root portion of the given training tooth by determining a contour of the training root portion in a projection of the training root portion to the at least one of the second and the third anatomical plane associated with the training subject; and analyzing a combination of the first and second boundary geometries of the training root portion to identify and remove artefacts generated during at least one of the first and second surface boundary identification phases.

In some implementations of the method, the generating the orthodontic treatment plan comprises determining, based on the segmented root portion of the given tooth, at least one configuration of an orthodontic appliance to be applied to the plurality of teeth of the subject.

In some implementations of the method, the 3D scan is a 3D radiographic scan.

In accordance with a third broad aspect of the present technology, there is provided a method for developing an orthodontic treatment for a subject. The method comprises: acquiring a 3D scan of an arch form of the subject, the arch form having a plurality of teeth, a given tooth of the plurality of teeth having a crown portion and a root portion; defining, in the 3D scan, a plurality of slices representative of cross-sections of the arch form that are extending in parallel to a first anatomical plane associated with the subject; identifying, during a first surface boundary identification phase, a first boundary geometry of the root portion of the given tooth by determining, using the plurality of slices of the 3D scan, a contour of each cross-section of the root portion in the first anatomical plane associated with the subject; identifying, during a second surface boundary identification phase, following the first surface boundary identification phase, a second boundary geometry of the root portion of the given tooth by determining a contour of the root portion in a projection of the root portion to at least one of a second and a third anatomical planes associated with the training subject; analyzing a combination of the first and second boundary geometries of the root portion to identify artefacts generated during at least one of the first and second surface boundary identification phases; removing the artefacts from the combination of the first and second boundaries geometries of the root portion to generate a final boundary geometry of the root portion of the given tooth; segmenting, in the 3D scan, the root portion of the given tooth along the generated final boundary geometry; and generating the orthodontic treatment for the subject using data of the segmented root portion of the given tooth.

In some implementations of the method, the identifying each one of the first and second boundary geometries comprises applying a 2D boundary identification model.

In some implementations of the method, the 2D boundary identification model is a numeric 2D boundary identification model.

In some implementations of the method, the generating the orthodontic treatment comprises determining, based on the segmented root portion of the given tooth, at least one configuration of an orthodontic appliance to be applied to the plurality of teeth of the subject.

In some implementations of the method, the 3D scan is a 3D radiographic scan.

In accordance with a fourth broad aspect of the present technology, there is provided a server for training a machine-learning algorithm (MLA) for identifying a subject's teeth in imaging data associated with the subject. The server comprises at least one processor and a non-transitory computer-readable memory storing executable instructions, which, when executed on by the at least one processor, cause the server to: generate a training data set, by: acquire a 3D scan of a training arch form of a training subject, the training arch form having a plurality of teeth, a given tooth of the plurality of teeth having a crown portion and a root portion; define, in the 3D scan, a plurality of slices representative of cross-sections of the training arch form that are extending in parallel to a first anatomical plane associated with the training subject; identify, during a first surface boundary identification phase, a first boundary geometry of the root portion of the given tooth by determining, using the plurality of slices of the 3D scan, a contour of each cross-section of the root portion in the first anatomical plane associated with the training subject; identify, during a second surface boundary identification phase, following the first surface boundary identification phase, a second boundary geometry of the root portion of the given tooth by determining a contour of the root portion in a projection of the root portion to at least one of a second and a third anatomical planes associated with the training subject; analyze a combination of the first and second boundary geometries of the root portion to identify artefacts generated during at least one of the first and second surface boundary identification phases; remove the artefacts from the combination of the first and second boundaries geometries of the root portion to generate a final boundary geometry of the root portion of the given tooth; segment, in the 3D scan, the root portion of the given tooth along the generated final boundary geometry; and store data of the segmented root portion for further use in training the MLA.

In some implementations of the server, to identify each one of the first and second boundary geometries, the executable instructions cause the server to apply a 2D boundary identification model.

In some implementations of the server, the 2D boundary identification model is a numeric 2D boundary identification model.

In some implementations of the server, prior to causing the server to identify the first boundary geometry, the executable instructions cause the server to: acquire a 3D digital model comprising a plurality of mesh elements defining a surface of crown portions of the plurality of teeth of the training subject; merge the 3D digital model with the 3D scan to generate an augmented 3D scan of the plurality of teeth; define, in the augmented 3D scan, another plurality of slices representative of cross-sections of the training arch form that are extending in parallel to the first anatomical plane associated with the training subject; and wherein: to identify, during the first surface boundary identification phase, the first boundary geometry comprises the executable instructions causing the server to identify a third boundary geometry of the crown and root portions of the given tooth by determining, using the other plurality of slices of the augmented 3D scan, a contour of each cross-section of the given tooth in the first anatomical plane associated with the training subject; to identify, during the second surface boundary identification phase, following the first surface boundary identification phase, the second boundary geometry comprises the executable instructions causing the server to identify a fourth boundary geometry of the crown and root portions of the given tooth by determining, using the other plurality of slices of the augmented 3D scan, a contour of each cross-section of the given tooth in the at least one of the second and the third anatomical plane associated with the training subject, to analyze the combination of the first and second boundary geometries comprises the executable instructions causing the server to analyze a combination of the third and fourth boundary geometries of the given tooth to identify artefacts generated during at least one of the first and second surface boundary identification phases; to remove the artefacts comprises the executable instructions causing the server to remove artefacts from the combination of the third and fourth boundaries geometries of the given tooth to generate a second final boundary geometry of the given tooth; to segment the root portion of the given tooth comprises the executable instructions causing the server to segment, in the augmented 3D scan, the given tooth along the generated second final boundary geometry; and to store comprises the executable instructions causing the server to store data of the segmented given tooth for further use in training the MLA.

In some implementations of the server, to merge the 3D digital model with the 3D scan comprises the executable instructions causing the server to apply an Iterative Closest Point (ICP) algorithm.

In some implementations of the server, the first anatomical plane is a transverse anatomical plane, the second anatomical plane is a sagittal anatomical plane, and the third anatomical plane is a coronal anatomical plane.

In some implementations of the server, the MLA is a Convolutional Neural Network (CNN)-based MLA.

In some implementations of the server, the executable instructions further cause the server to train the MLA using the data of the segmented root portion; use the trained MLA to identify the subject's teeth in the imaging data; and generate, based on the identified subject's teeth, an orthodontic treatment for the subject.

In some implementations of the server, to train the MLA, the executable instructions further cause the server to: generate a plurality of training digital objects, a given training digital object of which comprises a respective slice of the plurality of slices of the 3D scan including the root portion of the given tooth with the final boundary geometry applied thereon; feed the given training digital object to the MLA, thereby causing the MLA to generate an intermediate boundary geometry around the root portion of the given tooth in the respective slice of the 3D scan image; and minimize a difference between the intermediate boundary geometry and the final boundary geometry, thereby causing the MLA to generate an in-use boundary geometry around the root portion of a given in-use tooth within a given in-use slice of an in-use 3D scan.

In some implementations of the server, to minimize the difference, the executable instructions cause the server to minimize a respective value of a loss function.

In some implementations of the server, the executable instructions further cause the server to use the trained MLA for generating the in-use boundary geometry around the given in-use tooth in the imaging data, by: acquiring the in-use 3D scan of an in-use arch form of the subject, the in-use arch form having a plurality of in-use teeth including the given in-use tooth; defining, in the in-use 3D scan, a plurality of in-use slices, including the given in-use slice, representative of cross-sections that are extending in parallel to the first anatomical plane associated with the training subject; feeding the given in-use slice of the plurality of in-use slices to the MLA, thereby causing the MLA to generate the in-use boundary geometry of the root portion of the given in-use tooth; segmenting, in the in-use 3D scan, the root portion of the given in-use tooth along the generated in-use boundary geometry; and storing data of the segmented root portion of the given in-use tooth for further use determining an orthodontic treatment for the subject.

In some implementations of the server, the 3D scan is a 3D radiographic scan.

In accordance with a fifth broad aspect of the present technology, there is provided an electronic device for developing an orthodontic treatment plan for a subject using a machine-learning algorithm (MLA). The MLA has been trained to identify root portions of a plurality of teeth of the subject based on a training data set, which has been generated by: acquiring training slices of a training 3D scan representative of cross-sections of the training arch form of the training subject that are extending in parallel to a first anatomical plane associated with the training subject, the training arch form having a plurality of training teeth, a given training tooth of the plurality of training teeth having a training crown portion and a training root portion; and analyzing boundary geometries of the training root portion of the given training tooth in (i) the first anatomical plane and (ii) at least one of a second anatomical plane and a third anatomical plane associated with the training subject to identify and remove image artefacts. The electronic device comprises at least one processor and a non-transitory computer-readable memory storing instructions, which, when executed by the at least one processor, cause the electronic device to: acquire a 3D scan representative of an arch form of the subject, the arch form having the plurality of teeth, a given tooth of the plurality of teeth having a crown portion and a root portion; define, in the 3D scan, a plurality of slices representative of cross-sections of the arch form of the subject that are extending in parallel to the first anatomical plane associated with the subject; feed a given slice of the plurality of slices to the MLA, thereby causing the MLA to generate a boundary geometry of the root portion of the given tooth; segment, in the 3D scan, the root portion of the given tooth along the generated boundary geometry; and generate the orthodontic treatment plan for the subject using data of the segmented root portion of the given tooth.

In some implementations of the electronic device, the analyzing comprises: identifying, during a first surface boundary identification phase, a first boundary geometry of the training root portion of the given training tooth by determining, using the training slices of the training 3D scan, a contour of each cross-section of the training root portion in the first anatomical plane associated with the training subject; identifying, during a second surface boundary identification phase, following the first surface boundary identification phase, a second boundary geometry of the training root portion of the given training tooth by determining a contour of the training root portion in a projection of the training root portion to the at least one of the second and the third anatomical plane associated with the training subject; and analyzing a combination of the first and second boundary geometries of the training root portion to identify and remove artefacts generated during at least one of the first and second surface boundary identification phases.

In some implementations of the electronic device, to generate the orthodontic treatment plan, the executable instructions cause the electronic device to determine, based on the segmented root portion of the given tooth, at least one configuration of an orthodontic appliance to be applied to the plurality of teeth of the subject.

In some implementations of the electronic device, the 3D scan is a 3D radiographic scan.

In accordance with a sixth broad aspect of the present technology, there is provided an electronic device for developing an orthodontic treatment for a subject. The electronic device comprises at least one processor and a non-transitory computer-readable memory storing executable instructions, which, when executed by the at least one processor, cause the electronic device to: acquire a 3D scan of an arch form of the subject, the arch form having a plurality of teeth, a given tooth of the plurality of teeth having a crown portion and a root portion; define, in the 3D scan, a plurality of slices representative of cross-sections of the arch form that are extending in parallel to a first anatomical plane associated with the subject; identify, during a first surface boundary identification phase, a first boundary geometry of the root portion of the given tooth by determining, using the plurality of slices of the 3D scan, a contour of each cross-section of the root portion in the first anatomical plane associated with the subject; identify, during a second surface boundary identification phase, following the first surface boundary identification phase, a second boundary geometry of the root portion of the given tooth by determining a contour of the root portion in a projection of the root portion to at least one of a second and a third anatomical planes associated with the training subject; analyze a combination of the first and second boundary geometries of the root portion to identify artefacts generated during at least one of the first and second surface boundary identification phases; remove the artefacts from the combination of the first and second boundaries geometries of the root portion to generate a final boundary geometry of the root portion of the given tooth; segment, in the 3D scan, the root portion of the given tooth along the generated final boundary geometry; and generate the orthodontic treatment for the subject using data of the segmented root portion of the given tooth.

In some implementations of the electronic device, to identify each one of the first and second boundary geometries, the executable instructions cause the electronic device to apply a 2D boundary identification model.

In some implementations of the electronic device, the 2D boundary identification model is a numeric 2D boundary identification model.

In some implementations of the electronic device, to generate the orthodontic treatment, the executable instructions cause the electronic device to determine, based on the segmented root portion of the given tooth, at least one configuration of an orthodontic appliance to be applied to the plurality of teeth of the subject.

In some implementations of the electronic device, the 3D scan is a 3D radiographic scan.

In the context of the present specification, the term “orthodontic treatment” is broadly referred to as any type of medical intervention aimed at correcting malocclusions associated with the subject’s teeth, including surgical and non-surgical manipulations, such as, but not limited to, using aligners and/or brackets. Further, the orthodontic treatment, as referred to herein, may be determined by a professional practitioner in the field of dentistry (such as an orthodontist, a maxillofacial surgeon, for example), or automatically by a specific software, based on respective image data and input parameters associated with the subject.

In the context of the present specification, the term "cutline" is a representation of an edge of an aligner, at an open end thereof, such as a line along which the edge of the aligner will be formed once an unfinished aligner is cut along the cutline.

In the context of the present specification, unless expressly provided otherwise, a computer system may refer, but is not limited to, an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that, unless otherwise explicitly specified herein, the drawings are not to scale.

DETAILED DESCRIPTION

Certain aspects and embodiments of the present technology are directed to methods of and systems for segmenting at least root portions of a subject's teeth in 3D imaging data (such as a CT scan or a 3D digital model) associated with the subject.

More specifically, certain aspects and embodiments of the present technology comprise a computer-implemented method of (i) identifying, in the 3D imaging data, using a 2D boundary identification model, a boundary geometry of a given tooth of the subject's teeth or a root portion thereof in at least two anatomical planes associated with the subject, such as those of coronal, sagittal, or transverse anatomical planes; (ii) removing image artefacts from the boundary geometry, thereby generating a more accurate boundary geometry of the given tooth or the root portion thereof, and (iii) segmenting the given tooth or the root portion thereof from the 3D imaging data for further use in determining an orthodontic treatment of the subject. In at least some non-limiting embodiments of the present technology, the so segmented given tooth or the root portion thereof can be used for training a machine-learning algorithm (MLA) for further use in identifying in-use teeth and/or root portions thereof in 3D imaging data associated with other subjects.

Certain embodiments of the present technology minimize, reduce, or avoid some of the problems noted with the prior art. For example, by implementing certain embodiments of the current technology in respect of segmenting the given tooth and/or portions thereof in the 3D imaging data one or more of the following advantages may be obtained: (1) using less computational resources for the segmentation due to using the 2D boundary identification model instead of using a 3D boundary identification model, which may allow more efficiently identifying the anatomically accurate boundary geometry of the given tooth and/or portions thereof; and, as a result, (2) a greater efficiency in developing more effective orthodontic treatments for subjects, which may include manufacturing orthodontic appliances therefor, such as orthodontic aligners or braces.

Orthodontic Treatment

Figure 1:
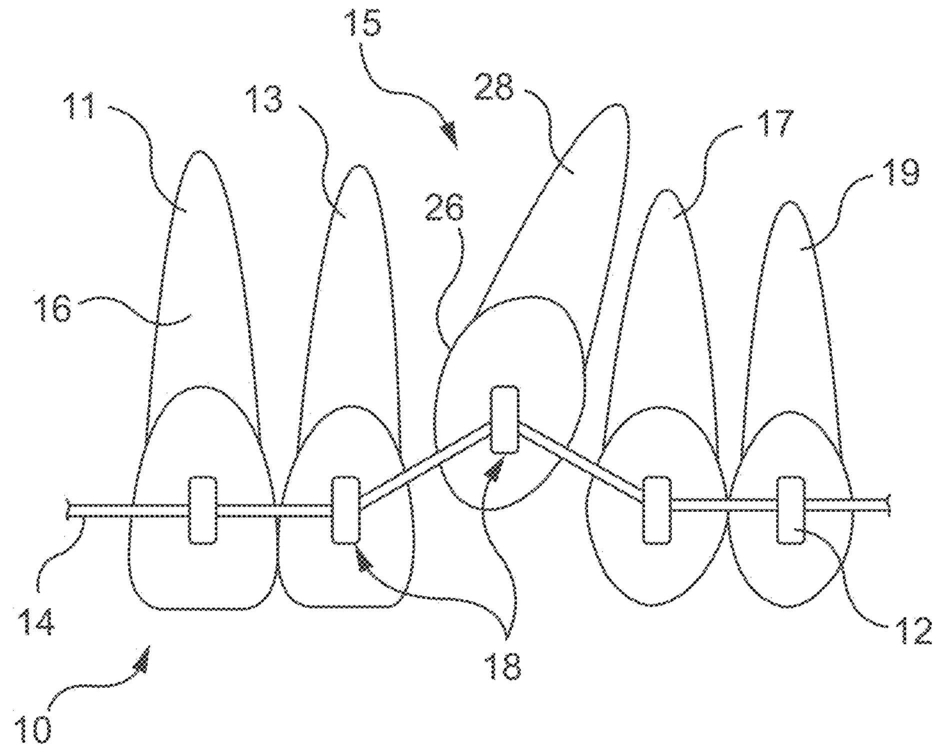
FIG. 1 depicts a schematic diagram of an orthodontic appliance attached to five teeth of a plurality of teeth of a subject.
Figure 2:
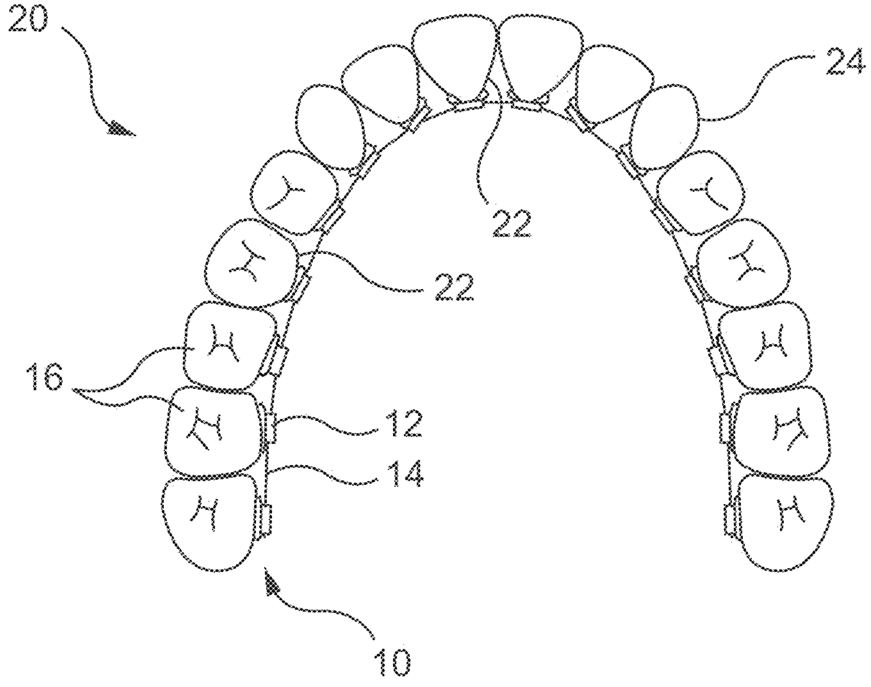
FIG. 2 depicts a schematic diagram of an upper arch form of the subject of FIG. 1 showing the orthodontic appliance of FIG. 1 attached thereto.

With initial reference to FIGS. 1 and 2, there is schematically depicted an example configuration of an orthodontic appliance 10 as part of the orthodontic treatment, to which certain aspects and embodiments of the present technology can be applied. Generally speaking, the orthodontic appliance 10 comprises brackets 12 and an archwire 14. The archwire 14 is made of a shape memory alloy such as Nitinol™, but can also be made of any other shape memory alloy or material having certain elasticity properties. The brackets 12 are respectively provided on some of upper teeth 16 (depicted individually as 11, 13, 15, 17, and 19), and the archwire 14 extends between, and is connected to each of the brackets 12. In the depicted embodiments of FIG. 1, the orthodontic treatment is aimed at misalignment of the given tooth 15; hence the orthodontic appliance 10 is configured to cause a given tooth 15 to move in a predetermined direction (such as downwardly) for alignment thereof with neighbouring ones of the upper teeth 16, that is, teeth 11, 13, 17, and 19.

As it can be appreciated from FIG. 1, the given tooth 15 includes a crown portion 26 and a root portion 28. The archwire 14 imposes a given force, caused by bends 18, on the given tooth 15 at a respective one of the brackets 12 having been installed on the crown portion 26. Thus, due to the shape memory effect of the archwire 14, the given tooth 15 will gradually move to an aligned position relative to the other ones of the upper teeth 16.

With reference to FIG. 2, as one non-limiting example, the orthodontic appliance 10 has been applied to all the upper teeth 16 of an upper arch form 20 of the subject, with the brackets 12 being attached to an internal surface 22 of the upper teeth 16. However, it should be noted that, in another non-limiting example, the orthodontic appliance 10 may be configured to be installed on an external surface 24 of the upper teeth 16.

It is contemplated that, according to some non-limiting embodiments of the present technology, the orthodontic appliance 10 may comprise orthodontic appliances of different types, shapes, sizes and configurations, such as, without limitation, multi-strand wires, strips, retainers, and plates. Furthermore, the bends 18 in the archwire 14 may comprise rounded corners or loops. It will also be appreciated that the orthodontic appliance 10 may be used for treating any type of teeth misalignment or malocclusion, including but not limited to closing gaps ("space closure"), creating/widening gaps, tooth rotation, tooth intrusion/extrusion, and translation, to name a few.

In some non-limiting embodiments of the present technology, the orthodontic appliance 10 can comprise an orthodontic aligner (not depicted), an inner surface of which defines a channel that is configured, in some non-limiting embodiments of the present technology, for receiving crown portions of at least some of the upper teeth 16 including the given tooth 15. The orthodontic aligner may be made of a polymer, such as a thermoplastic material. For example, the orthodontic aligner may be made of poly-vinyl chloride (PVC), polyethylene terephthalate glycol (PETG), or other suitable materials. The orthodontic aligner is designed in such a way that the inner surface thereof is configured to impose certain forces on one or more of the upper teeth 16 to obtain a desired position of at least some thereof at a given stage of the orthodontic treatment—such as the desired aligned position of the given tooth 15 as mentioned above.

Also, it should be expressly understood that although the above description is provided for the orthodontic appliance 10 that is to be applied to the upper teeth 16, a similar orthodontic appliance can be produced for treating misalignments in lower teeth (not depicted), without departing from the scope of the present technology.

It is contemplated that, before installing the orthodontic appliance 10 onto the upper teeth 16 for the alignment of the given tooth 15, movements thereof, in the course of the orthodontic treatment, should be modelled to ensure that the given tooth 15 will eventually reach the aligned position over an expected period. To that end, image data indicative of crown and/or root portions (such as the crown portion 26 and the root portion 28 of the given tooth 15) of the upper teeth 16 may be used to model the given force to be applied onto the given tooth 15, which may include, without being limited to: a magnitude of the given force, a direction thereof, and an application point thereof within the crown portion 26. Accordingly, based on the image data indicative of the crown portions, the modelling may, for example, allow avoiding collisions between the crown portion 26 of the given tooth 15 with any one of those teeth of the upper teeth 16 adjacent thereto.

However, in certain cases, the modelling of the tooth movements may be conducted to prevent other undesired effects of the orthodontic treatment. For example, the modelling may allow ensuring that the current orthodontic treatment would not cause damage to any of the upper teeth 16 at the level of their root portions, as well as to other structures associated therewith, such as tissues of an upper gingiva (not depicted) surrounding the upper teeth 16, those of a maxillary alveolar bone (not depicted), proximal nerve pathways and blood vessels (not depicted), and the like. Further, when modelling tooth movements, considerations can be made in respect of overall comfort of the orthodontic treatment for the subject, on which his or her tolerance and adherence to the orthodontic treatment may depend.

Figure 3:
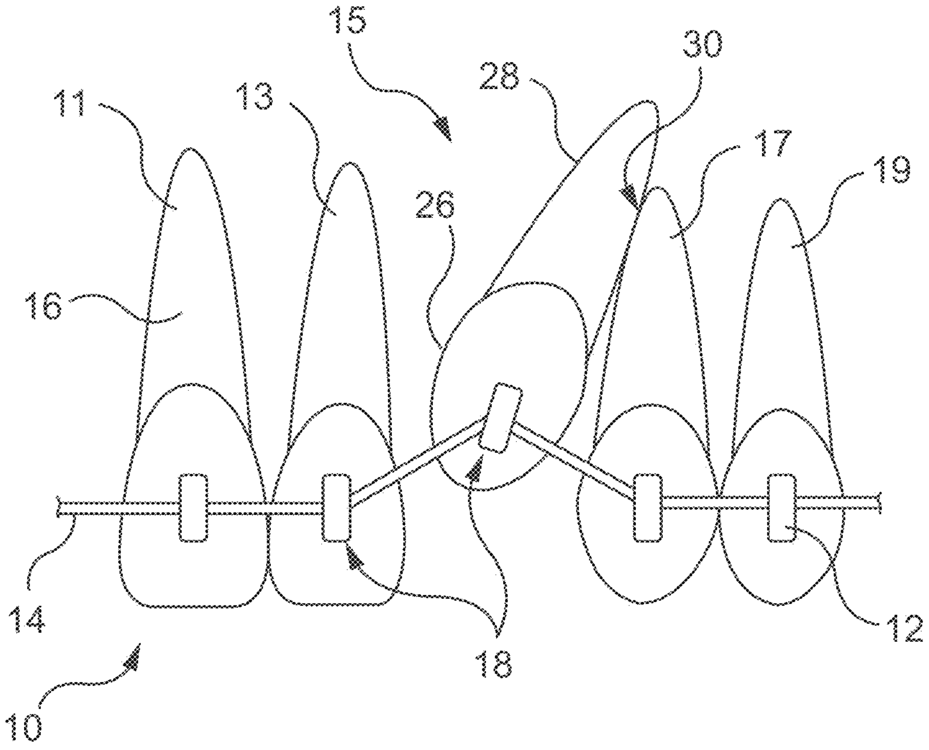
FIG. 3 depicts a schematic diagram of an intermediate phase of the orthodontic treatment including applying the orthodontic appliance of FIG. 1, in accordance with certain non-limiting embodiments of the present technology.

With reference to FIG. 3, there is depicted a schematic diagram of a phase of the orthodontic treatment based on applying the orthodontic appliance 10 to the upper teeth 16, in accordance with certain non-limiting embodiments of the present technology. The depicted phase may be an intermediate phase or an initial phase, for example.

As it can be appreciated, at the phase depicted in FIG. 3, the root portion 28 of the given tooth 15, in the course of the movement thereof towards the aligned position, collides with a root portion (not separately labelled) of a second tooth 17 adjacent thereto, thereby forming a collision area 30.

Accordingly, the collision area 30 may be associated with undesired effects, such as damage (such as a chip or a crack, for example) of one of the given tooth 15 and the second tooth 17, or discomfort (pain, for example) caused to the subject.

As another example (not depicted), the root portion 28 may deviate in another direction causing damage to the upper gingiva, which may result in the root portion 28 protruding through the upper gingiva causing to the subject, for example, an aesthetic defect or pain from using the orthodontic appliance 10.

In other words, the image data indicative solely of the crown portion 26 may be insufficient for a comprehensive analysis of the movements and determining intermediate positions of the given tooth 15, as a whole, during the orthodontic treatment, which may hence require image data indicative of the root portion 28. Such comprehensive analysis may allow for a more accurate planning orthodontic treatment of the subject, aimed at mitigating the risks of at least some of the undesired effects mentioned above.

To address the above-mentioned technical problem, certain conventional techniques have been proposed for identifying the root portion 28 of the given tooth 15 in 3D imaging data (such as Cone Beam Computed Tomography (CBCT) data) using 3D boundary segmentation models, such as a 3D level set model. However, such approaches are associated with considerable consumption of computational resources of a processor (such as a processor 550 described below with reference to FIG. 5), which may lower the overall efficiency of the root portion segmentation.

Other approaches known in the art are directed to using 2D boundary identification approaches, such as a 2D level set model, however only in a single projection of the upper teeth 16. As will be explained below, such approaches may "overlook" certain image artefacts derived from the original 3D imaging data, which may result in the lower anatomical accuracy of the so segmented representation of the root portion 28 of the given tooth 15. As a result, the orthodontic treatment developed based on such artefact-laden representations of the upper teeth 16 may have lower effectiveness and/or cause discomfort to the given subject.

Thus, the developers of the present technology have appreciated that applying the 2D boundary identification model to at least two different projections of the given tooth 15 may allow identifying and removing the image artefacts imposed during the generation of the 3D imaging data; and a more accurate representation of the root portion 28 of the given tooth 15 can thus be generated. Accordingly, the so segmented representation of the root portion 28 can be used for a more accurate modelling of the tooth movements of the upper teeth during the course of the planned orthodontic treatment.

Also, the developers have recognized that more accurate representations of the root portions of the upper teeth 16, obtained using at least some non-limiting embodiments of the methods and systems described herein, can be used to train a machine-learning algorithm (MLA). This MLA can then be used to automatically segment the teeth of other subjects in the associated 3D imaging data during the development of orthodontic treatments and the manufacturing of corresponding configurations of the orthodontic appliance 10. This can facilitate and expedite the overall process of developing and conducting of orthodontic treatments without loss in accuracy thereof.

How the upper teeth 16 can be segmented within the 3D imaging data, in accordance with the non-limiting embodiments of the present technology, will be described below with reference to FIGS. 6 to 12.

System

Figure 4:
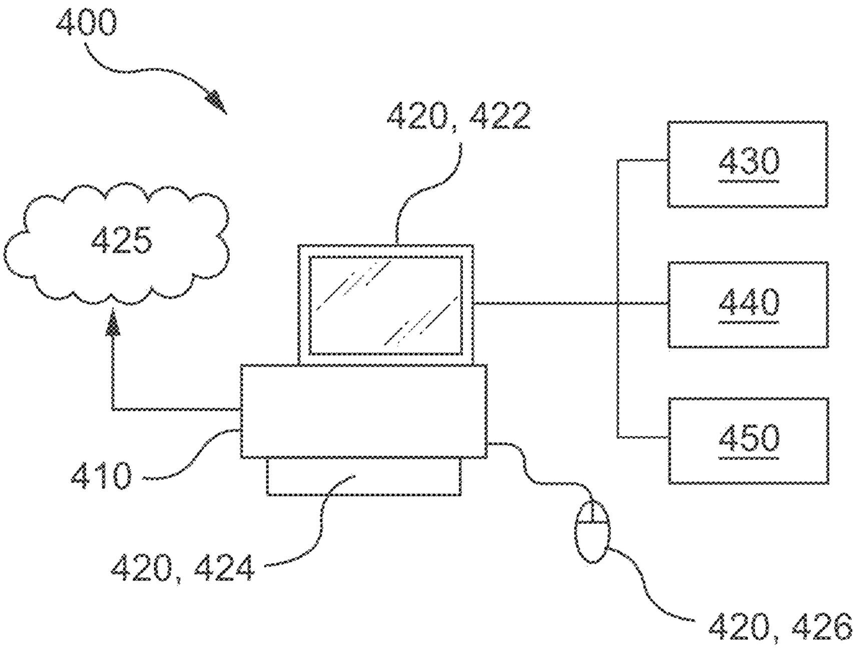
FIG. 4 depicts a schematic diagram of a system for identifying the plurality of teeth of the subject of FIG. 1 in 3D imaging data using a trained machine-learning algorithm (MLA), in accordance with certain embodiments of the present technology.
Figure 5:
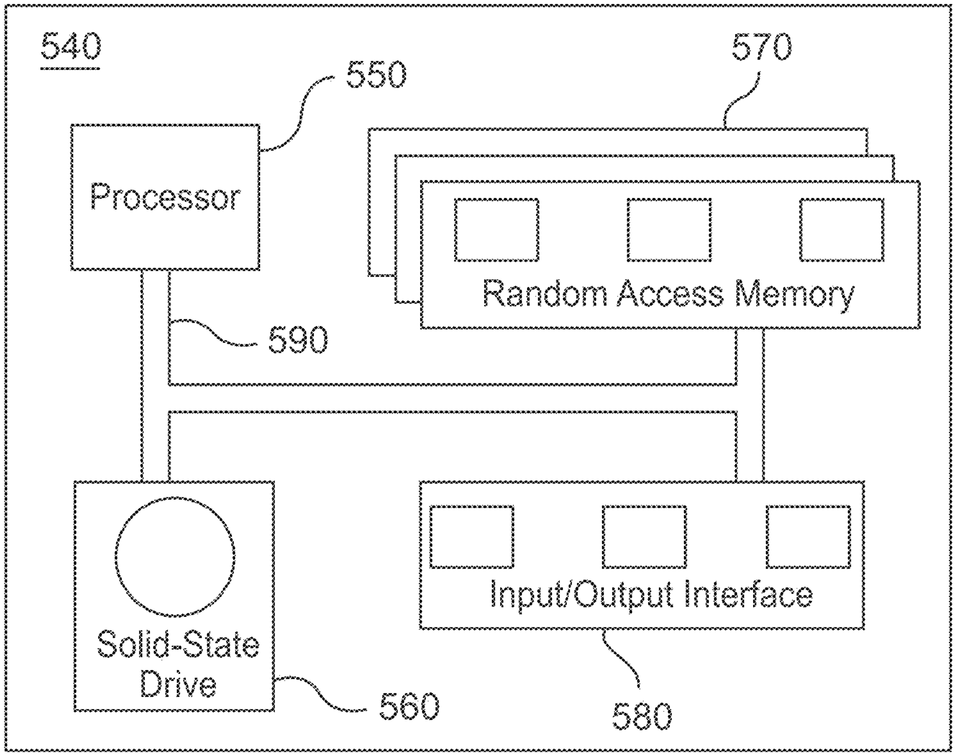
FIG. 5 depicts a schematic diagram of a computing environment of the system of FIG. 4, in accordance with certain embodiments of the present technology.

With reference to FIGS. 4 and 5, there is depicted a schematic diagram of a system 400 suitable for identifying subject's teeth, such as the upper teeth 16 mentioned above, in 3D imaging data for developing orthodontic treatments and manufacturing orthodontic appliances, in accordance with certain non-limiting embodiments of the present technology.

It is to be expressly understood that the system 400 as depicted is merely an illustrative implementation of the present technology. Thus, the description that follows is intended to be only a description of illustrative examples of the present technology. This description is not intended to define the scope or set forth the bounds of the present technology. In some cases, what is believed to be helpful examples of modifications to the system 400 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 400 may provide in certain instances simple implementations of the present technology, and that where such is the case they have been presented in this manner as an aid to understanding. As persons skilled in the art would further understand, various implementations of the present technology may be of a greater complexity.

In certain non-limiting embodiments of the present technology, the system 400 of FIG. 4 comprises a computer system 410. The computer system 410 may be configured, by pre-stored program instructions, to identify, based on image data associated with the subject, the upper teeth 16 including the root portions thereof, such as the root portion 28 of the given tooth 15 mentioned above. Further, based on the so-obtained representations of the upper teeth 16, the computer system 410 can be configured to produce the orthodontic appliance 10 for further use in orthodontic treatment of the subject, as mentioned above.

To that end, in some non-limiting embodiments of the present technology, the computer system 410 may be configured to receive image data pertaining to the subject or to a given stage of the orthodontic treatment. According to some non-limiting embodiments of the present technology, the computer system 410 may receive the image data via local input/output interface (such as USB, as an example, not separately depicted). In other non-limiting embodiments of the present technology, the computer system 410 may be configured to receive the image data over a communication network 425, to which the computer system 410 is communicatively coupled.

In some non-limiting embodiments of the present technology, the communication network 425 is the Internet and/or an Intranet. Multiple embodiments of the communication network may be envisioned and will become apparent to the person skilled in the art of the present technology. Further, how a communication link between the computer system 410 and the communication network 425 is implemented will depend, inter alia, on how the computer system

410 is implemented, and may include, but is not limited to, a wire-based communication link and a wireless communication link (such as a Wi-Fi communication network link, a 3G/4G communication network link, and the like).

It should be noted that the computer system 410 can be configured for receiving the image data from a vast range of devices. Some of such devices can be used for capturing and/or processing data pertaining to maxillofacial and/or cranial anatomy of the subject. In certain embodiments, the image data received from such devices is indicative of properties of anatomical structures of the subject, including: teeth, intraoral mucosa, maxilla, mandible, temporomandibular joint, and nerve pathways, among other structures. In some non-limiting embodiments of the present technology, at least some of the image data is indicative of properties of external portions of the anatomical structures, for example dimensions of a given gingival sulcus of the upper gingiva surrounding the upper teeth 16, and dimensions of an external portion of the given tooth 15 of the upper teeth 16, such as the crown portion 26 extending outwardly of the gingival sulcus. In some non-limiting embodiments of the present technology, the image data is indicative of properties of internal portions of the anatomical structures, for example, volumetric properties of bone surrounding an internal portion of the given tooth 15 extending inwardly of the given gingival sulcus, such as the root portion 28 of the given tooth 15. Under certain circumstances, such volumetric properties may be indicative of periodontal anomalies which may be factored into an orthodontic treatment plan. In some non-limiting embodiments of the present technology, the image data includes cephalometric image datasets. In some embodiments, the image data includes datasets generally intended for the practice of endodontics. In some embodiments, the image data includes datasets generally intended for the practice of periodontics.

In alternative non-limiting embodiments of the present technology, the computer system 410 may be configured to receive the image data associated with the subject directly from an imaging device 430 communicatively coupled thereto. Broadly speaking, the processor 550 may be configured to cause the imaging device 430 to capture and/or process the image data of the upper teeth 16 and the periodontium (not depicted) of the subject. In certain non-limiting embodiments of the present technology, the image data may include, for example, one or more of: (1) images of external surfaces of respective crown portions of the upper teeth 16, (2) images of an external surface of the periodontium including that of the upper gingiva, for example, and images of superficial blood vessels and nerve pathways associated with the upper teeth 16; and (3) images of an oral region. By doing so, the imaging device 430 may be configured, for example, to capture image data of an upper arch form 20 of the subject, including the upper teeth 16 and the upper gingiva surrounding the upper teeth 16. In another example, the imaging device 430 may also be configured to capture and/or process image data of a lower arch form (not depicted) associated with the subject without departing from the scope of the present technology. It should be noted that the image data may include two-dimensional (2D) data and/or three-dimensional data (3D). Further, in certain non-limiting embodiments of the present technology, the image data includes 2D data, from which 3D data may be derived, and vice versa.

In some non-limiting embodiments of the present technology, the imaging device 430 may comprise an intra-oral scanner enabling to capture direct optical impressions of the upper arch form 20 the subject. In a specific non-limiting example, the intraoral scanner can be of one of the types available from MEDIT, CORP. of 23 Goryeodae-ro 22-gil, Seongbuk-gu, Seoul, South Korea. It should be expressly understood that the intraoral scanner can be implemented in any other suitable equipment.

In yet other non-limiting embodiments of the present technology, the imaging device 430 can comprise a 3D laser scanner enabling to obtain a respective point cloud 3D digital model of the upper arch form 20—such as by scanning the upper arch form 20 directly or a mold thereof and thus registering three-dimensional coordinates of points representative of the surface of the upper arch form 20. In a specific non-limiting example, the 3D laser scanner can be of one of the types available from LASER DESIGN LTD. of 5900 Golden Hills Drive, Minneapolis, MN 55416. It should be expressly understood that the desktop scanner can be implemented in any other suitable equipment.

In further non-limiting embodiments of the present technology, the imaging device 430 can comprise a computed tomography (CT)-based imaging device. Such CT-based imaging devices are configured to acquire volumetric data of dental and maxillofacial structures, enabling three-dimensional reconstruction of the upper arch form 20, including the crowns and root portions of the upper teeth 16 extending from the surrounding alveolar bone.

According to certain non-limiting embodiments, the CT-based imaging device can comprise at least one of the following: (1) a conventional multislice CT (MSCT) scanner, commonly used in general diagnostic and surgical procedures, which can be configured to generate sequential radiographic images comprising cross-sectional views of craniofacial structures; and (2) a cone-beam computed tomography (CBCT) scanner, which utilizes a cone-shaped X-ray beam and a flat panel detector to acquire a full 3D volumetric dataset in a single rotation around the subject.

In a specific non-limiting example, the CT-based imaging device can be a CBCT scanner of the i-CAT™ FLX V-Series type, available from IMAGING SCIENCES INTERNATIONAL, LLC of 1910 North Penn Road, Hatfield, PA 19440, the United States of America. It should be expressly understood that the CT-based imaging system can be implemented using any other suitable CBCT or MSCT imaging equipment.

In yet other non-limiting embodiments of the present technology, the imaging device 430 can comprise other imaging devices capable of generating 3D images of the crown and root portions of the upper teeth 16 and their supporting structures. For example, in these embodiments, the imaging device 430 can comprise at least one of: (1) a magnetic resonance imaging (MRI) imaging device configured to generate non-ionizing images of the upper arch form 20; (2) an intra-oral scanner combined with machine learning models to infer root structures from crown morphology, such as the root portion 28 of the given tooth 15 mentioned above; and (3) a ultrasound-based imaging device for acquiring root-level anatomical information in a non-ionizing manner.

Further, it is contemplated that the computer system 410 may be configured for processing of the received image data. The resulting image data of the upper arch form 20 and the cutting device 464 received by the computer system 410 is typically structured as a binary file or an ASCII file, may be discretized in various ways (e.g., point clouds, polygonal meshes, pixels, voxels, implicitly defined geometric shapes), and may be formatted in a vast range of file formats (e.g., STL, OBJ, PLY, DICOM, and various software-specific, proprietary formats). Any image data file format is included within the scope of the present technology. For implementing functions described above, the computer system 410 may further comprise a corresponding computing environment.

Further, in some non-limiting embodiments of the present technology, the system 400 may be configured, based on the acquired image data of the upper arch form 20, for example, determine the orthodontic treatment for the subject including (i) determining tooth trajectories for the at least some of the upper teeth 16, such as the given tooth 15, defining their paths from their initial to target positions; and (ii) respective forces to be applied to the at least some of the upper teeth 16 causing them to move along the so determined tooth trajectories.

For example, in some non-limiting embodiments of the present technology, the processor 550 can be configured to determine the tooth trajectories and the respective forces causing the upper teeth 16 to move along the tooth trajectories as described in U.S. Pat. No. 10,993,782-B1 issued on May 4, 2021, and entitled "SYSTEMS AND METHODS FOR DETERMINING A TOOTH TRAJECTORY", the content of which is incorporated herein by reference in its entirety.

Further, in certain non-limiting embodiments of the present technology, the system 400 may be configured to produce at least one configuration of the orthodontic appliance 10, configured to cause the at least some of the lower teeth 16 to move along the so determined tooth trajectories based on the planned orthodontic treatment.

To that end, the system 400 can further include a manufacturing system 440, to which the processor 550 can be configured to send respective instructions causing the manufacturing system 440 to produce the at least one configuration of the orthodontic appliance 10, such as an orthodontic aligner, mentioned above.

More specifically, in those embodiments where the orthodontic appliance 10 is an orthodontic aligner, the manufacturing system 440 can be a thermoforming system configured to produce an unfinished aligner, for example, using a thermoforming process, in which a preform aligner (not depicted) is shaped on the mold of the upper arch form 20.

In a specific non-limiting example, the thermoforming system can be of one of the types provided by HAMER LTD of Rambla Antoni Gaudi, 108792 La Granada (Barcelona) Spain. It should be expressly understood that the thermoforming system can be implemented in any other suitable equipment.

Further, after the thermoforming the unfinished aligner, the system 400 can be configured to trim excess material thereof along preliminarily determined cutline to produce an open edge of at least one configuration of the orthodontic aligner. It is not limited how the cutline for the orthodontic aligner can be determined and how the system 400 can be implemented for producing various configurations of the orthodontic aligner. In some non-limiting embodiments of the present technology, the cutline can be determined and the system 400 can be implemented to cut the unfinished aligner along the unfinished aligner along the determined cutline as described, for example, in a co-pending U.S. patent application Ser. No. 19/243,375, filed with the United States Patent and Trademark Office on Jun. 19, 2025, and entitled "SYSTEMS AND METHODS FOR CONTROLLING A CUTTING HEAD OF A CUTTING DEVICE," the content of which is incorporated herein by reference in its entirety. Embodiments where the manufacturing system 440 is implemented as an additive manufacturing system, such as a 3D printer, are also envisioned without departing from the scope of the present technology.

Also, in some non-limiting embodiments of the present technology, the system 400 can be configured to identify the upper teeth 16 in the acquired imaging data using a machine-learning algorithm (MLA) 450. To that end, the system 400 can be configured to execute two distinct processes with respect to the MLA 450. During a first, training process, the system 400 can be configured to train the MLA 450 based on training image of training subjects' teeth to identify the teeth of in-use subjects in 3D imaging data thereof, such as the upper teeth 16. In a second, in-use process, the system 400 can be configured to use the trained MLA 450 for identifying the upper teeth 16 of the subject.

According to certain non-limiting embodiments of the present technology, the MLA 450 can be implemented based on a Deep Neural Network (DNN). For example, such a DNN can comprise a Convolutional Neural Network (CNN). For example, in some non-limiting embodiments of the present technology, the MLA 450 can be implemented based on a U-Net architecture. In other non-limiting embodiments of the present technology, the MLA 450 can be implemented based on a V-Net architecture. In yet other non-limiting embodiments of the present technology, the MLA 450 can be implemented based on an Attention U-Net architecture. In further other non-limiting embodiments of the present technology, the MLA 450 can be implemented based on a ResUNet/ResUNet++ architecture.

More specifically, in those non-limiting embodiments, where the MLA 450 is implemented as a CNN based on the U-Net architecture, the MLA 450 can include (as an example) a total of twenty-three (23) layers, including a contracting path having four down-sampling levels, a bottleneck portion, and an expanding path having four up-sampling levels. The contracting path may begin with sixty-four (64) convolutional filters and may double the number of filters at each successive down-sampling stage until reaching approximately one thousand twenty-four (1024) filters at the bottleneck. The expanding path may reduce the number of filters in half at each up-sampling stage, returning to sixty-four (64) filters at the output stage. The convolutional kernels may have dimensions of approximately 3×3.

The network may receive as input 2D image data, such as one of a plurality of 2D slices representative of the maxillofacial region of the given subject, as will be described in detail below. These slices can include (as an example) grayscale images of 572×572×1 or RGB images of 572×572×3, normalized to a range of [0,1]. The output may comprise a segmentation mask having substantially the same spatial dimensions as the input (for example, 388×388×C, where C corresponds to the number of classes). The output can be generated (as an example) by a softmax activation function.

Embeddings may be generated (as an example) through successive convolutions and pooling operations in the contracting path, wherein contextual features are extracted, and through skip connections that preserve spatial information. The embeddings may correspond to multi-scale feature maps generated at the encoder layers. More details on this implementation of the MLA 450 can be found, for example, in an article entitled "*U-Net: Convolutional Networks for Biomedical Image Segmentation*," authored by Ronneberger et al., and published in *Medical Image Computing and Computer-Assisted Intervention—MICCAI* 2015 on Nov. 18, 2015, the content of which is incorporated herein by reference in its entirety.

Further, in some non-limiting embodiments of the present technology, where the MLA 450 is implemented as a CNN based on the V-Net architecture, the MLA 450 can include (as an example) from twenty to thirty (20-30) layers arranged into five to six stages. Each stage of the contracting path may include one to three convolutional layers, and the expanding path may be symmetric thereto. The architecture may further incorporate residual connections. The contracting path may commence with sixteen (16) filters and may double the number of filters per stage up to two hundred fifty-six (256). Convolutions may be volumetric, for example, having kernel dimensions of 5×5×5.

The input may comprise 3D volumetric data, such as a 3D scan representative of a maxillofacial region of the given subject, as will be described in detail below. Such a 3D scan can be, for example, of 128×128×64×1 computed tomography (CT) or magnetic resonance imaging (MRI) volumes. The output may comprise a 3D segmentation mask of substantially the same dimensions as the input volume, with class probabilities generated (as an example) by softmax or sigmoid functions.

Embeddings may be generated (as an example) through volumetric convolutions and residual connections, wherein down-sampling reduces spatial dimensionality while increasing the number of channels. The embeddings may correspond to volumetric feature maps encoding contextual information. More details on this implementation of the MLA 450 can be found, for example, in an article entitled "*V-Net: Fully Convolutional Neural Networks for Volumetric Medical Image Segmentation*," authored by Milletaril et al., and published on arxiv.org on Jun. 14, 2016, the content of which is incorporated herein by reference in its entirety.

In yet other non-limiting embodiments of the present technology, where the MLA 450 is implemented as a CNN based on the Attention U-Net architecture, the MLA 450 can include (as an example) from twenty-five to thirty (25-30) layers, including a contracting path with four (4) down-sampling stages, a bottleneck, and an expanding path with four (4) up-sampling stages. Attention gates may be incorporated into the skip connections between the contracting and expanding paths.

Similar to the U-Net architecture, the contracting path may utilize a number of filters, ranging (as an example) from sixty-four (64) to one thousand twenty-four (1024). Attention mechanisms may be implemented, for example, using one-by-one (1×1) convolutional gating signals.

The input may include 2D or 3D images, such as 256×256×3 RGB images normalized to a predetermined range. The output may comprise (as an example) a segmentation mask of substantially the same size as the input. Embeddings may be generated by combining coarse features derived from the contracting path with fine features from the expanding path. The attention gates may suppress irrelevant activations and emphasize salient regions, thereby generating weighted feature maps directed to the target structures. More details on this implementation of the MLA 450 can be found, for example, in an article entitled "*Attention U-Net: Learning Where to Look for the Pancreas*," authored by Oktay et al., and published on arxiv.org on Apr. 11, 2018, the content of which is incorporated herein by reference in its entirety.

In yet other non-limiting embodiments of the present technology, where the MLA 450 is implemented as a CNN based on the ResUNet/ResUNet++ architectures, the MLA 450 can include either fifteen (15) convolutional layers (ResUNet), or forty-one (41) convolutional layers (ResUNet++). The architectures may include an encoder, a bridge, and a decoder, and may further employ residual connections.

The number of filters may range (as an example) from thirty-two (32) to five hundred twelve (512). ResUNet++ may further include atrous spatial pyramid pooling (ASPP), attention modules, and squeeze-and-excitation blocks to provide channel-wise attention.

The input may comprise 2D images, such as (as an example) 256×256×3 RGB images normalized to floating-point values in ranges such as [0,1] or [−1,1]. The output may comprise a segmentation mask having dimensions substantially equivalent to the input, generated (as an example) by activation functions such as softmax (for multi-class classification) or sigmoid (for binary segmentation).

Embeddings may be generated progressively within the encoder, capturing low-level edge features and high-level semantic features. Residual blocks may preserve gradient flow; ASPP modules may capture multi-scale contextual information; and attention mechanisms may refine intermediate feature maps. The embeddings may correspond to enhanced feature maps encoding spatial and semantic information relevant to segmentation tasks. More details on this implementation of the MLA 450 can be found, for example, in an article entitled "*ResUNet++: An Advanced Architecture for Medical Image Segmentation*," authored by Jha et al., and published on arxiv.org on Nov. 16, 2019, the content of which is incorporated herein by reference in its entirety.

In another example, the DNN can comprise a Vision Transformer (ViT) NN, as described, for example, in an article, entitled "*TransUNet: Transformers Make Strong Encoders for Medical Image Segmentation*," authored by Chen et al. and published on arxiv.org on Feb. 8, 2021, the content of which is incorporated herein by reference in its entirety.

It should be expressly understood that any other DNN-based Encoder-Decoder architecture, suitable for the tasks of medical image data segmentation can be used for implementing the MLA 450 without departing from the scope of the present technology.

Further, with reference to FIG. 5, there is depicted a schematic diagram of a computing environment 540 suitable for use with some implementations of the present technology. The computing environment 540 comprises various hardware components including one or more single or multi-core processors collectively represented by the processor 550, a solid-state drive 560, a random-access memory 570 and an input/output interface 580. Communication between the various components of the computing environment 540 may be enabled by one or more internal and/or external buses 590 (for example, a PCI bus, universal serial bus, IEEE 1394 "Firewire" bus, SCSI bus, Serial-ATA bus, ARINC bus, etc.), to which the various hardware components are electronically coupled.

The input/output interface 580 allows enabling networking capabilities such as wire or wireless access. As an example, the input/output interface 580 comprises a networking interface such as, but not limited to, a network port, a network socket, a network interface controller, and the like. Multiple examples of how the networking interface may be implemented will become apparent to the person skilled in the art of the present technology. For example, but without being limiting, the input/output interface 580 may implement specific physical layer and data link layer standard such as Ethernet™, Fibre Channel, Wi-Fi™ or Token Ring™. The specific physical layer and the data link layer may provide a base for a full network protocol stack, allowing communication among small groups of computers on the same local area network (LAN) and large-scale network communications through routable protocols, such as IP.

According to implementations of the present technology, the solid-state drive 560 stores program instructions suitable for being loaded into the random-access memory 570 and executed by the processor 550, according to certain aspects and embodiments of the present technology. For example, the program instructions may be part of a library or an application.

In some non-limiting embodiments of the present technology, the computing environment 540 is implemented in a generic computer system, which is a conventional computer (that is, an "off the shelf" generic computer system). The generic computer system may be a desktop computer/personal computer but may also be any other type of electronic device such as, but not limited to, a laptop, a mobile device, a smart phone, a tablet device, or a server.

As persons skilled in the art of the present technology may appreciate, multiple variations as to how the computing environment 540 can be implemented may be envisioned without departing from the scope of the present technology.

Referring back to FIG. 4, the computer system 410 has at least one interface device 420 for providing an input or an output to a user of the system 400, the interface device 420 being in communication with the input/output interface 580. In the embodiment of FIG. 4, the interface device is a screen 422. In other non-limiting embodiments of the present technology, the interface device 420 may be a monitor, a speaker, a printer, or any other device for providing an output in any form such as an image form, a written form, a printed form, a verbal form, a 3D model form, or the like.

In the depicted embodiments of FIG. 4, the interface device 420 also comprises a keyboard 424 and a mouse 426 for receiving input from the user of the system 400. Other interface devices 420 for providing an input to the computer system 410 can include, without limitation, a USB port, a microphone, a camera, or the like.

The computer system 410 may be connected to other users, such as through their respective clinics, through a server (not depicted). The computer system 410 may also be connected to stock management or client software which could be updated with stock when the orthodontic treatment has been determined and/or schedule appointments or follow-ups with clients, for example.

Methods

Figure 6:
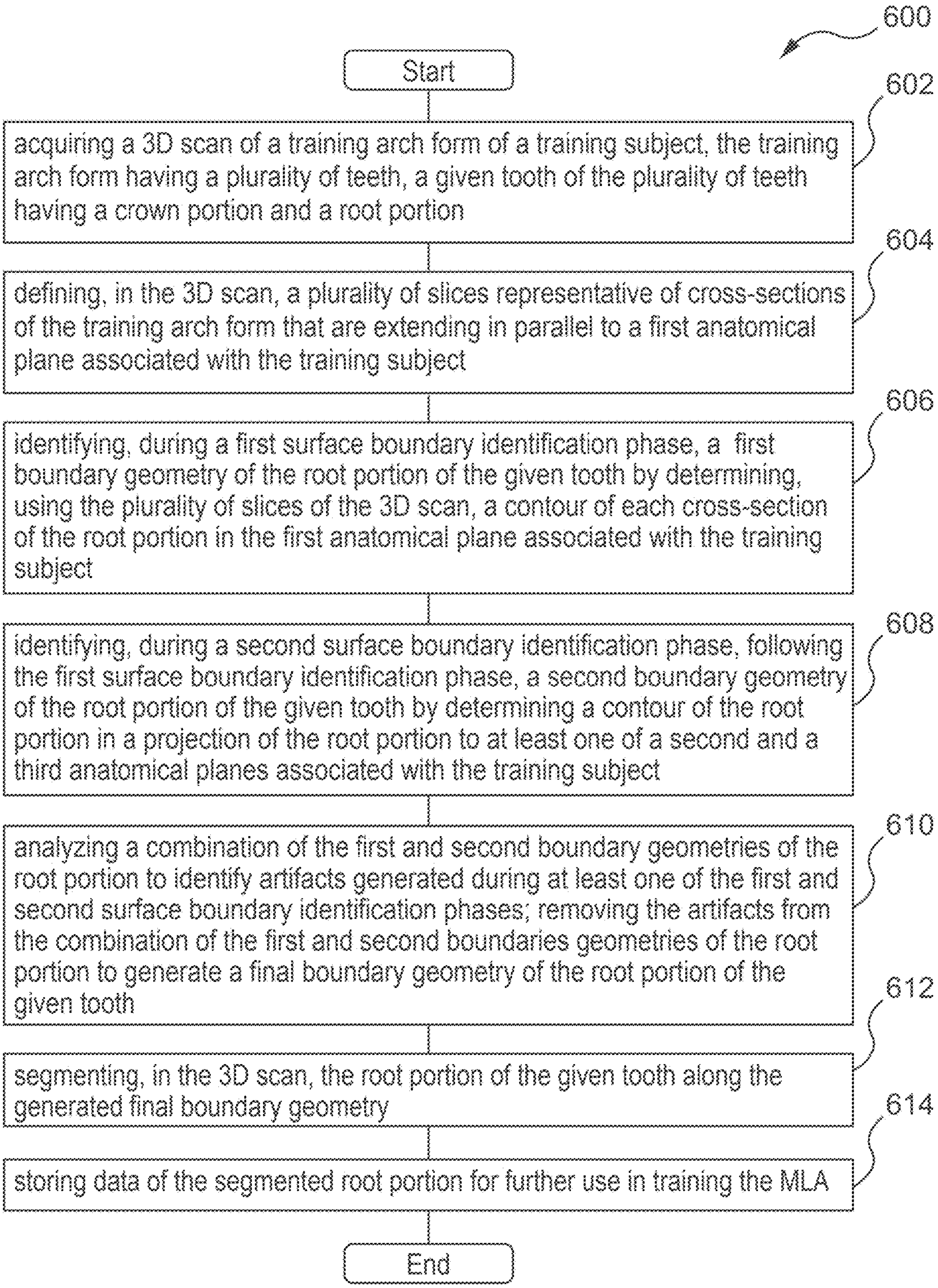
FIG. 6 depicts a flowchart diagram of a first method for training the MLA for identifying the plurality of teeth of the subject of FIG. 1 in the 3D imaging data, in accordance with certain non-limiting embodiments of the present technology.

Given the architecture and examples provided above, it is possible to execute a method for training the MLA 450 for identifying the upper teeth 16 of the subject in the 3D imaging data associated therewith. With reference to FIG. 6, there is depicted a flowchart diagram of a first method 600 of the training process of the MLA 450, in accordance with certain non-limiting embodiments of the present technology. For example, the first method 600 can be executed by the processor 550 of the system 400.

Step 602: Acquiring a 3D Scan of a Training Arch Form of a Training Subject, the Training Arch Form Having a Plurality of Teeth, a Given Tooth of the Plurality of Teeth Having a Crown Portion and a Root Portion According to certain non-limiting embodiments of the present technology, the first method 600 commences with the processor 550 being configured to acquire training 3D imaging data of the maxillofacial region of the given training subject, including a respective upper arch form. The modality of the training 3D imaging data is not limited and depends generally on a type and a particular configuration of the imaging device 430. Thus, in some non-limiting embodiments of the present technology, where the imaging device 430 comprises a CBCT scanner or MSCT scanner mentioned above, the training 3D imaging data can include a plurality of 2D slices defined in one of anatomical planes associated with the training subject. However, it should be noted that the use of the imaging device 430 of other types, such as an MRI imaging device or an ultrasound imaging device, mentioned above, is also envisioned.

Thus, according to certain non-limiting embodiments of the present technology, the imaging device 430 can be configured to generate and store the training 3D imaging data, for example, in a DICOM format. Other suitable formats are also envisioned. In some non-limiting embodiments of the present technology, the processor 550 can be configured to receive the training 3D imaging data of the maxillofacial region of the training subject that has been generated by a third-party imaging device and transmitted to the system 400 either over the communication network 425 or via the input/output interface 580, such as USB.

Figure 7A:
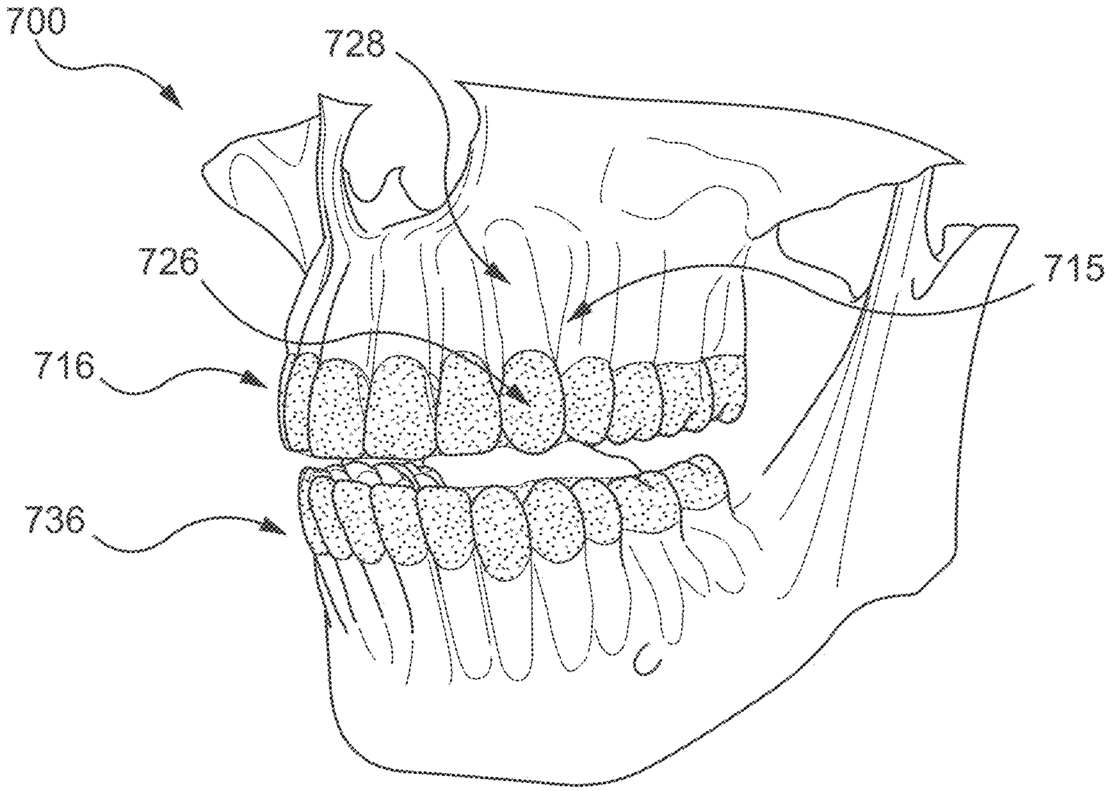
FIGS. 7A and 7B schematically depict a training 3D scan and a training 3D digital model, respectively, that are representative of training teeth of a training subject, generated using various imaging techniques, and used for training the MLA, in accordance with certain non-limiting embodiments of the present technology.

Further, in some non-limiting embodiments of the present technology, using the so generated training 3D imaging data, the processor 550 can be configured to generate a training 3D scan 700 of the maxillofacial region of the training subject, which is schematically depicted in FIG. 7A, in accordance with certain non-limiting embodiments of the present technology.

In some non-limiting embodiments of the present technology where the training 3D imaging data is a plurality of CT slices, to generate the training 3D scan 700, the processor 550 can be configured to apply an isosurface extraction algorithm.

In the context of the present technology, the isosurface extraction algorithm is a algorithms that extract a surface mesh representing a constant-value surface (an isosurface, in other words) from 3D volumetric scalar fields such as those from CT, MRI, or other medical imaging modalities. According to certain non-limiting embodiments of the present technology, the isosurface extraction algorithm can comprise one of a Marching Cubes algorithm, a SurfaceNets algorithm, a Dual Contouring algorithm, and others.

By doing so, the processor 550 can be configured to generate the training 3D scan 700 comprising a plurality of mesh elements (not depicted) representative of a surface of the captured maxillofacial region of the training subject. For example, the training 3D scan 700 can comprise the plurality of mesh elements including, without limitation, triangular mesh elements, quadrilateral mesh elements, convex polygonal mesh elements, or even concave polygonal mesh elements, as an example, without departing from the scope of the present technology. In these embodiments, by applying the isosurface extraction algorithm, the processor 550 can be configured to generate the training 3D scan 700 in one of an STL, an OBJ, or a PLY format.

As it can be appreciated, the training 3D scan 700 is representative of (1) a training upper arch from 720 including training upper teeth 716 and (2) a training lower arch form 740 including training lower teeth 736. According to certain non-limiting embodiments of the present technology, the processor 550 can be configured to generate the training 3D scan 700 such that it is representative of external and internal structures of the training upper and lower arch forms 720, 740. For example, as best seen from FIG. 7A, a given training tooth 715 in the training 3D scan 700 has a training crown portion 726 and a training root portion 728.

In some non-limiting embodiments of the present technology, as will become apparent from the description provided hereinbelow, the processor 550 can be configured to use the training 3D scan 700 for segmenting training root portions of the training upper teeth 716, such as the training root portion 728 of the given training tooth 715 for further training the MLA 450 to identify the root portions of in-use teeth, such as the root portion 28 of the given tooth 15 mentioned above.

In other non-limiting embodiments of the present technology, the processor 550 can be configured to use the training 3D scan 700 for training the MLA 450 for identifying each of the in-use teeth in their entirety, including associated crown and root portions. However, in those embodiments where the training 3D scan 700 is generated based on MSCT or CBCT imaging data, it may lack sufficient spatial resolution for certain external anatomical structures of the training upper and lower arch forms 720, 740. These structures may include the training crown portions, occlusal surfaces formed between opposing teeth, interproximal contacts between adjacent training crown portions within a given training arch form, and the incisal edges of the training crown portions.

In this regard, for using the training 3D scan 700 for training the MLA 450 for identifying the entire ones of the in-use teeth in in-use 3D imaging data, in some non-limiting embodiments of the present technology, the processor 550 can be configured to augment the training 3D scan 700 with more accurate digital representations of training crowns of the training upper teeth 716 and the training lower teeth 736.

Figure 7B:
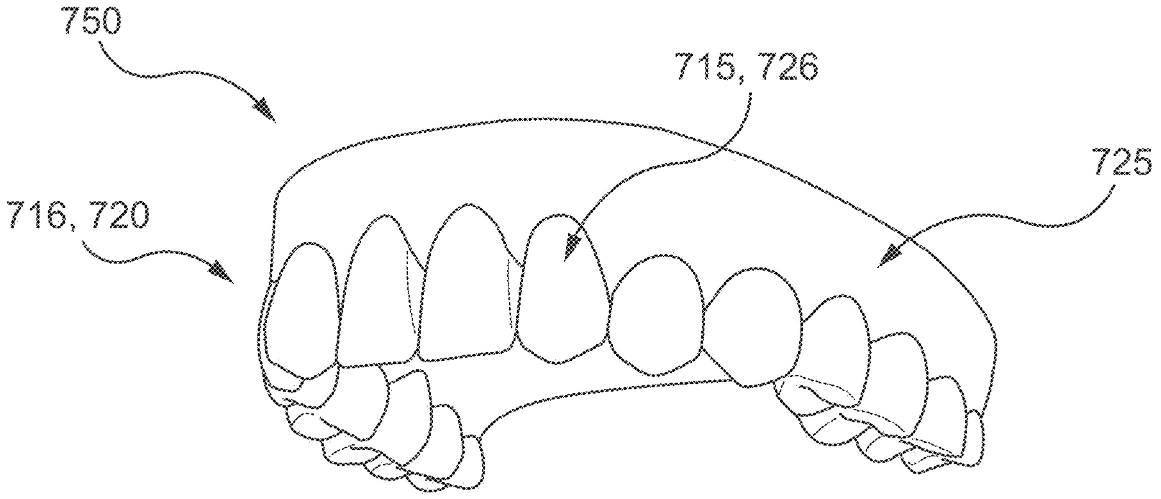
Figure 8:
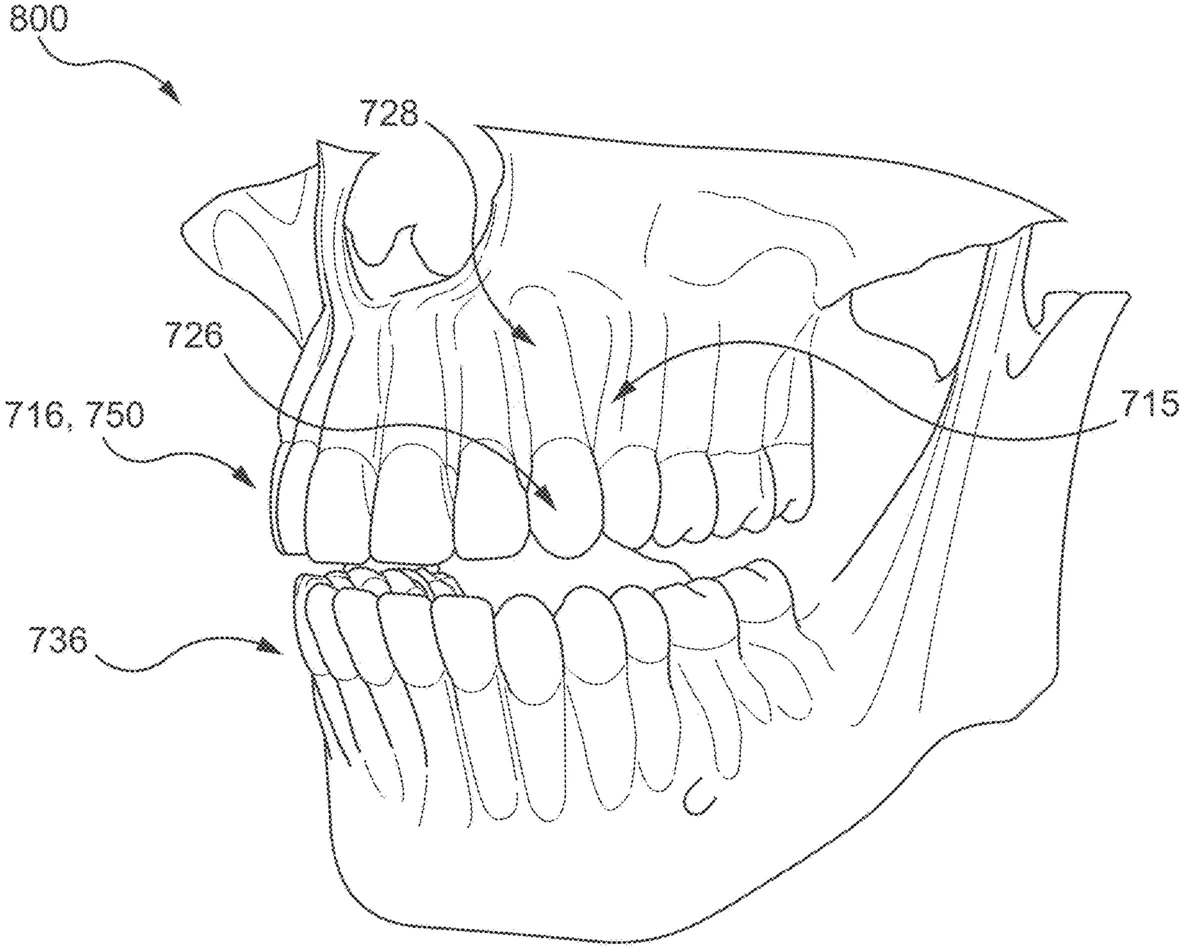
FIG. 8 depicts an augmented training 3D scan, generated by merging the training 3D scan and the training 3D digital model of FIGS. 7A and 7B and used for training the MLA, in accordance with certain non-limiting embodiments of the present technology.

With reference to FIG. 7B, there is depicted a training 3D digital model 750 of the training upper arch form 720 including the training crown portions of the training upper teeth 716 and a training upper gingiva 725. According to certain non-limiting embodiments of the present technology, to generate such an augmented training 3D, such as an augmented training 3D scan 800, schematically depicted in FIG. 8, in accordance with certain non-limiting embodiments of the present technology, the processor 550 can be configured to: (i) receive the training 3D digital model 750; (ii) segment representations of training crown portions of the training upper teeth 716 from the training 3D digital model 750; and (iii) merge the segmented representations of the training crown portions from the training 3D digital model 750 with those in the training 3D scan 700.

According to certain non-limiting embodiments of the present technology, similar to the training 3D scan 700, the training 3D digital model 750 may comprise a plurality of mesh elements defining (1) surfaces of the training crown portions of the training upper teeth 716, such as the training crown portion 726 of the given training tooth 715, and (2) a surface of the training upper gingiva 725. For example, the processor 550 can be configured to acquire the training 3D digital model 750 from the imaging device 430, which includes an intraoral scanner, configured for the direct generation of 3D meshes.

Further, it is not limited how the processor 550 can be configured to segment the training crown portions from the training upper teeth 716 in the training 3D digital model 750. For example, to do so, in some non-limiting embodiments of the present technology, the processor 550 can be configured to use one of the approaches described in U.S. Pat. No. 10,950,061-B1, entitled "SYSTEMS AND METHODS FOR PLANNING AN ORTHODONTIC TREATMENT," and issued on Mar. 16, 2021, the content of which is incorporated herein by reference in its entirety.

More specifically, in these embodiments, to identify the training crown portion 726 of the given training tooth 715 in the training 3D digital model 750, the processor 550 can be configured for: (i) acquiring the training 3D digital model 750 as mentioned above, the training 3D digital model 750 comprising a defined portion forming part of a surface of the given tooth, and at least one undefined portion not forming part of the surface of the given tooth, the training 3D digital model 750 having a plurality of vertices comprising: constrained vertices associated with the defined portion, each constrained vertex having a constrained vertex normal vector; unconstrained vertices initially associated with the undefined portion, each unconstrained vertex having an unconstrained vertex normal vector; (ii) generating a set of confirmed constrained vertices, including the constrained vertices associated with the defined portion, for providing an augmented 3D representation of the training crown portion 726 of the given training tooth 715 by: iteratively, for a given constrained vertex, identifying at least one associated unconstrained vertex which is adjacent to the given constrained vertex in the training 3D digital model 750; determining an angular difference between the constrained vertex normal vector of the given constrained vertex and the unconstrained vertex normal vector of the at least one associated unconstrained vertex; in response to the angular difference being equal to or below a predetermined threshold value: identifying the at least one associated unconstrained vertex to be a constrained vertex associated with the defined portion for inclusion in the set of confirmed constrained vertices; and in response to the angular difference being above the predetermined threshold value: identifying the at least one associated unconstrained vertex to be an unconstrained vertex associated with the undefined portion for exclusion from the set of confirmed constrained vertices.

Further, to merge the so segmented 3D representations (not depicted) of the training crown portions of the training upper teeth 716, according to certain non-limiting embodiments of the present technology, the processor 550 can be configured to a 3D point cloud registration algorithm for identifying correspondences between vertices defining the segmented 3D representations of the training crown portions and vertices defining the surfaces of the training crown portions in the training 3D scan 700. According to various non-limiting embodiments of the present technology, the 3D point cloud registration algorithm can comprise one of an Iterative Closest Point (ICP) algorithm, a Coherent Point Drift (CPD) algorithm, or a RANdom SAmple Consensus (RANSAC) algorithm, to name a few.

For example, in those embodiments where the 3D point cloud registration algorithm includes the ICP algorithm, to find correspondences between the vertices defining the surfaces of the training crown portions segmented from the training 3D digital model 750 and in the training 3D scan, the processor 550 can be configured to: (i) iteratively establish point-to-point correspondences between a source point cloud (for example, vertices representative of the training crown portions segmented from the training 3D digital model 750) and a target point cloud (for example, vertices representative of the training crown portions in the training 3D scan 700) by identifying, for each source point, the closest point in the target point cloud in terms of Euclidean distance; (ii) estimate at least one rigid transformation, defined by a rotation matrix and a translation vector, that minimizes a pre-determined error metric (such as the root mean square (RMS) of the distances between the corresponding point pairs); and (iii) apply the computed transformation to the source point cloud and repeat the process until convergence is achieved. In other words, the processor 550 can be configured to iteratively repeat the above steps until a change in the error metric between iterations falls below a pre-determined threshold or a maximum number of iterations is reached.

Thus, by doing so, the processor 550 can be configured to generate the augmented training 3D scan 800. Further, the processor 550 can be configured to use either the training 3D scan 700 or the augmented training 3D scan 800 for the respective task of training the MLA 450 either to identify in the in-use 3D imaging data only the root portions of the in-use teeth or each of the in-use teeth in their entirety.

The first method 600 hence advances to step 604.

Step 604: Defining, in the 3D Scan, a Plurality of Slices Representative of Cross-Sections of the Training Arch Form that are Extending in Parallel to a First Anatomical Plane Associated with the Training Subject As it can be appreciated from FIGS. 7A and 8, the generation of the 3D imaging data by the imaging device 430 and further processing thereof by the processor 550 might impose certain image artefacts to the training root portions of the training upper and lower teeth 716, 736.

In the context of the present specification, the term “image artefacts” of an image (such as the augmented 3D scan 800) representative of a real object (such as the training upper arch form 720) broadly refers to portions of the image forming no part of the real object and generated, for example, due to imperfection of technical means (such as the imaging device 430) used for taking the image. Such image artefacts can include portions of the associated alveolar bone and gingiva preventing from clearly identifying the boundary of the training root portions, as well as digital noise imposed during the generation of the training 3D scan 700, caused, for example, by motion of the training subject during and/or limited resolution of the imaging device 430. As such, for a more accurate representation of the real object, the image artefacts need to be identified and removed from the image.

To do so, according to certain non-limiting embodiments of the present technology, the processor 550 can be configured to analyze cross sections of a given one of the training 3D scan 700 and the augmented training 3D scan 800, such as the training 3D scan 700, in various surface boundary identification phases. As will become apparent from the description provided below, a given surface boundary identification phase includes the processor 550 identifying a boundary geometry of the training root portion 728 of the given training tooth 715 in cross sections of the training 3D scan 700 in a respective anatomical plane associated with the training subject, that is, one of coronal, transverse, and sagittal anatomical planes.

To do so, at step 604, according to certain non-limiting embodiments of the present technology, the processor 550 can be configured to define, across the training 3D scan 700, a plurality of slices along a respective anatomical plane. For example, the processor 550 can be configured to define a first plurality of slices along a first, for example, transverse, anatomical plane associated with the training subject. In those embodiments where the training 3D scan 700 has been generated using the imaging device comprising an MSCT or a CBCT scanner described above, the processor 550 can be configured to define the first plurality of slices along the first anatomical plane, which correspond to the original plurality of slices generated by the imaging device 430. In these embodiments, a slice density of the plurality of slices extending along the first anatomical plane depends on settings of the imaging device 430.

However, in other non-limiting embodiments of the present technology, the processor 550 can be configured to define the first plurality of slices through the training 3D scan 700 along the first anatomical plane differently. For example, the processor 550 can be configured to define each one of the plurality of slices to be 0.075 mm thick resulting in the slice density of around 13 slices per mm. In another example, the processor 550 can be configured to define each one of the first plurality of slices to be 0.125 mm thick, resulting in the slices density of around 8 slices per mm. In yet another example, the processor 550 can be configured to define each slice of the first plurality of slices to be 0.2 mm thick resulting in the slice density of around 5 slices per mm. Other values for thickness of slices, providing for other respective values of the slice density, for defining the first plurality of slices extending through the training 3D scan 700 are also envisioned.

Figure 9A:
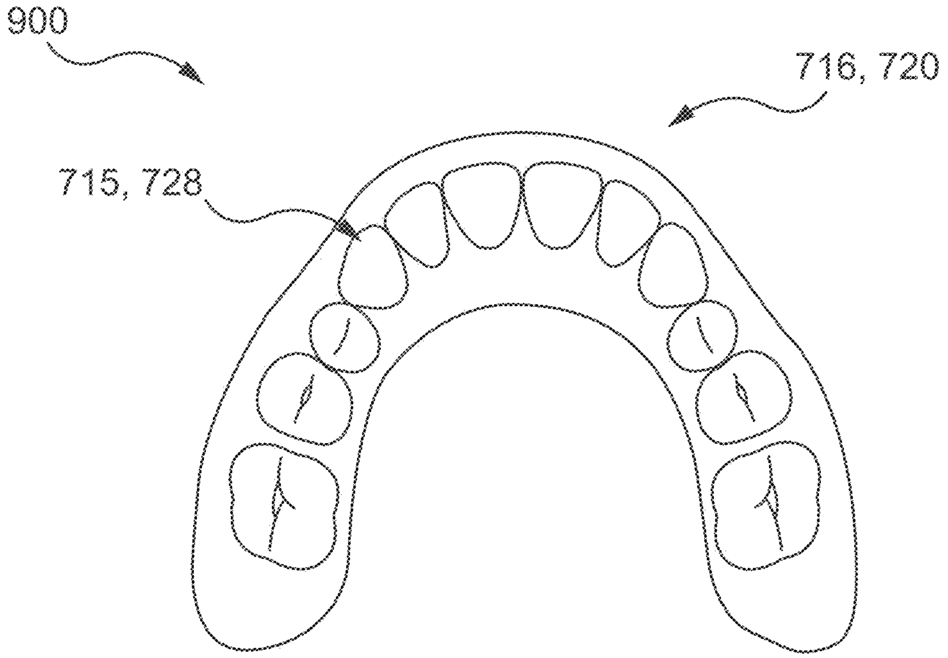
FIGS. 9A and 9B respectively depict (i) a given cross-section of one of the training 3D scan and the augmented 3D scan of FIGS. 7A and 8 along a first anatomical plane associated with the training subject and (ii) a first isolated view of a given training tooth in the given cross-section, in accordance with certain non-limiting embodiments of the present technology.

With reference to FIGS. 9A, there is schematically depicted a given slice 900 of the first plurality of slices defined through the training 3D scan 700 along the first anatomical plane, in accordance with certain non-limiting embodiments of the present technology. Further, the processor 550 can be configured to use the given slice 900 for identifying and removing image artefacts, as will be described below.

The first method 600 hence advances to step 606.

Step 606: Identifying, During a First Surface Boundary Identification Phase, a First Boundary Geometry of the Root Portion of the Given Tooth by Determining, Using the Plurality of Slices of the 3D Scan, a Contour of Each Cross-Section of the Root Portion in the First Anatomical Plane Associated with the Training Subject At step 606, according to certain non-limiting embodiments of the present technology, the processor 550 can be configured to execute a first surface boundary identification phase, which includes identifying a first boundary geometry of a respective training root portion of each training tooth of the training upper teeth 716 and the training lower teeth 736 in each slice of the first plurality of slices, such as the given slice 900.

Figure 9B:
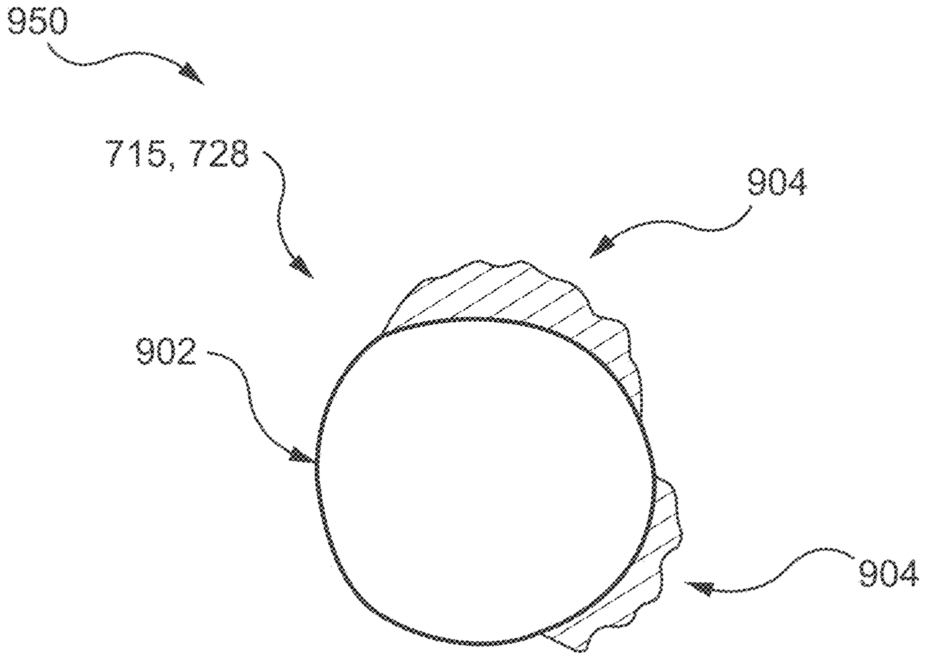

With reference to FIG. 9B, there is schematically depicted a first isolated view 950 of the training root portion 728 of the given training tooth 715 in the given slice 900, in accordance with certain non-limiting embodiments of the present technology.

According to certain non-limiting embodiments of the present technology, the processor 550 can be configured to identify the first boundary geometry by determining a respective contour of the training root portion 728 in each slice of the first plurality of slices, such as a respective first contour 902 in the given slice 900. By doing so, the processor 550 can be configured to identify, in the given slice 900, first image artefacts 904 that have been imposed, for example, by the imaging device 430, during the generation of the training 3D scan 700 as mentioned above.

According to certain non-limiting embodiments of the present technology, to identify the respective first contour 902 of the training root portion 728, the processor 550 can be configured to use a 2D boundary identification model. In some non-limiting embodiments of the present technology, the 2D boundary identification model can comprise a 2D level set model. More specifically, to identify the respective first contour 902 of the training root portion 728 using the 2D level set model, the processor 550 can be configured to (i) initialize a level set function (for example, a signed distance function) over a selected two-dimensional cross-sectional slice corresponding to a given anatomical plane (such as the given slice 900 extending along the first anatomical plane) associated with the training subject, such that the level set function implicitly represents an initial contour surrounding a target anatomical structure, for example, the training root portion 728; and (ii) iteratively update the level set function based on a speed function. Further, the processor 550 may be configured to numerically solve the corresponding partial differential equation to update the level set function at each iteration until a convergence condition is met, such as when changes between successive iterations fall below a predetermined threshold. Upon convergence, the processor 550 can extract the zero-level contour of the level set function as the identified respective first contour 902 of the training root portion 728 in the given slice 900.

The use of other 2D boundary identification models for identifying the respective first contour 902 of the training root portion 728 is also envisioned. For example, such other 2D boundary identification models can include, without limitation, an Active Contours (Snakes) 2D boundary identification model, a Geodesic Active Contours 2D boundary identification model, and a Chan-Vese Level Set 2D boundary identification model.

Further, the processor 550 can be configured to aggregate respective first contours of the training root portion 728 across the first plurality of slices, thereby identifying the first boundary geometry of the training root portion 728.

By doing so, the processor 550 can be configured to determine a respective first boundary geometry of the respective training root portion of each one of the training upper and lower training teeth 716, 736 in each one of the first plurality of slices extending through the training 3D scan along the first anatomical plane. By doing this, the processor 550 can be configured to identify respective image artefacts that are visible in the first anatomical plane associated with the training subject, such as the first image artefacts 904 associated with the training root portion 728 of the given training tooth 715.

The first method 600 hence advances to step 608.

Step 608: Identifying, During a Second Surface Boundary Identification Phase, Following the First Surface Boundary Identification Phase, a Second Boundary Geometry of the Root Portion of the Given Tooth by Determining a Contour of the Root Portion in a Projection of the Root Portion to at Least One of a Second and a Third Anatomical Planes Associated with the Training Subject After identifying the first boundary geometry of the training root portion 728, certain image artefacts that are not visible in the first (transverse) anatomical plane may still be omitted. For example, certain training root portions may be curved or elongated, and image artefacts therealong may not be well-visualized or readily detectable in the first anatomical plane. In another example, image artefacts imposed due to motion of the training subject during the generation of the training 3D scan 700, such as blurring or duplication, may not be captured in the first anatomical plane, but can clearly be visualized in other anatomical planes: a second, for example, coronal anatomical plane, and a third—a sagittal anatomical plane.

Thus, at step 608, according to certain non-limiting embodiments of the present technology, the processor 550 can be configured to execute a second surface boundary identification phase, during which the processor 550 can be configured to identify another respective boundary geometry of the respective training root portion of each one of the training upper and lower training teeth 716, 736. More specifically, during the second surface boundary identification phase, the processor 550 can be configured to determine a contour of the training root portion 728 of the given training tooth 715 in at least one other anatomical plane associated with the training subject, such as the second or third anatomical plane.

Figure 10B:
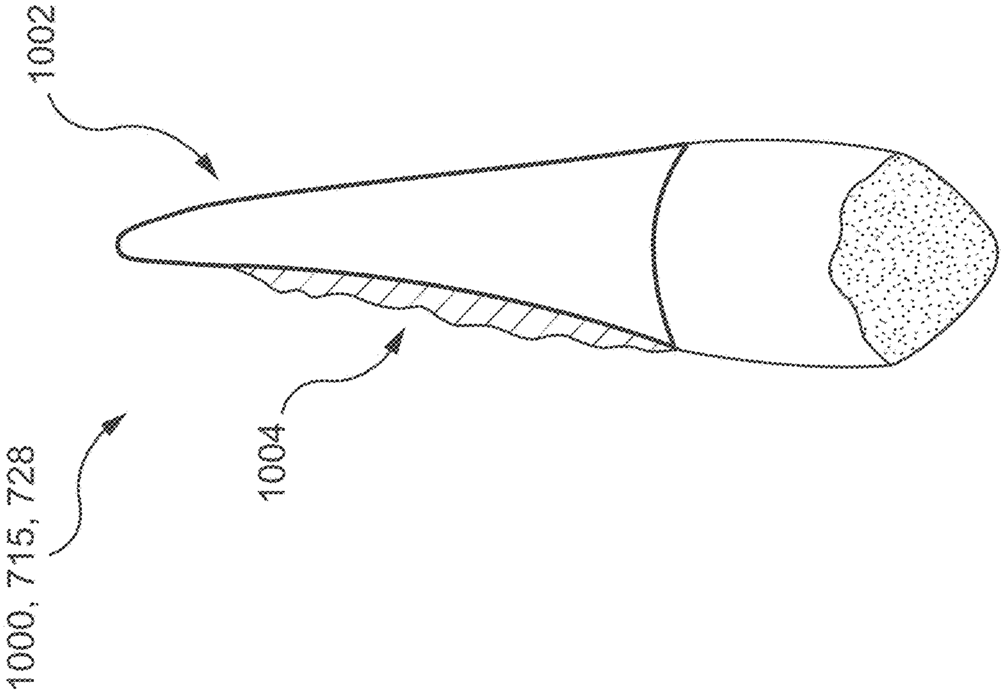
FIGS. 10A and 10B respectively (i) a first projection of one of the training 3D scan and the augmented 3D scan of FIGS. 7A and 8 to a second anatomical plane associated with the training subject and (ii) a second isolated view of the given training tooth in the second projection, in accordance with certain non-limiting embodiments of the present technology.
Figure 10A:
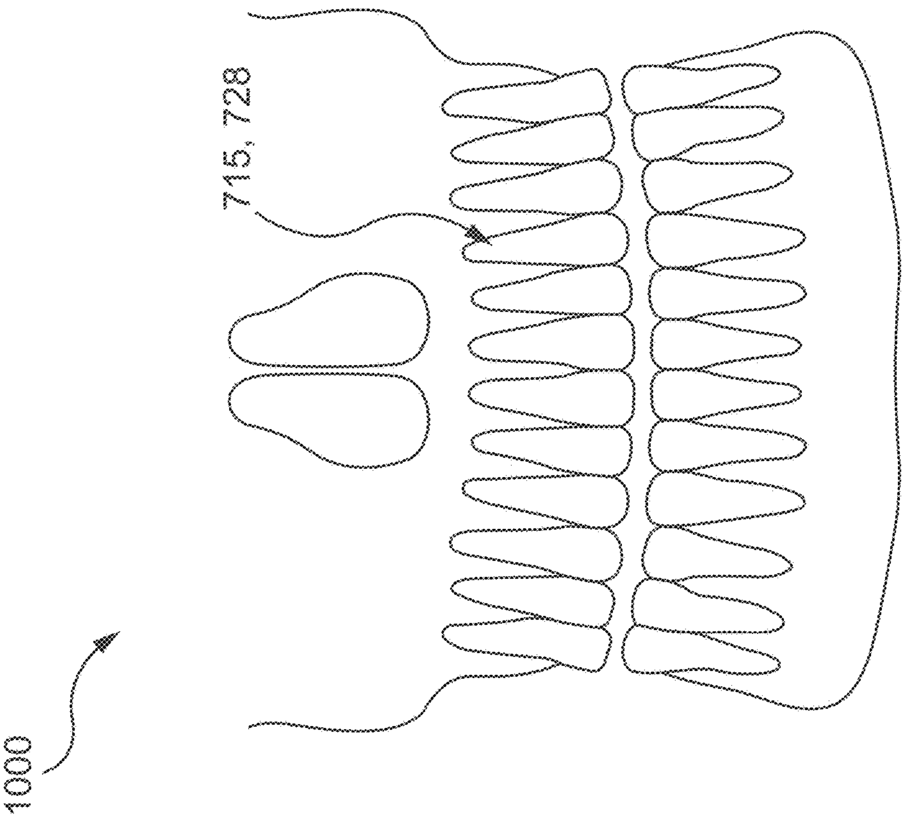

To do so, the processor 550 can be configured to generate a projection of the training 3D scan in the respective anatomical plane. With reference to FIGS. 10A and 10B, there is depicted a schematic diagram of a coronal projection 1000 of the training 3D scan 700 and a second isolated view 1050 of the given training tooth 715 in the coronal projection 1000, in accordance with certain non-limiting embodiments of the present technology.

Thus, using the coronal projection 1000 of the training 3D scan 700, the processor 550 can be configured to identify a second contour 1002 of the training root portion 728 in the second anatomical plane, thereby further identifying second image artefacts 1004. To do so, akin to identifying the respective first contour 902, the processor 550 can be configured to use the 2D boundary identification model.

Further, using the second contour 1002 identified in the coronal projection 1000 of the training 3D scan 700, the processor 550 can be configured to determine a second boundary geometry of the training root portion 728 in a 3D space.

In some non-limiting embodiments of the present technology, instead of using the coronal projection 1000 for determining the second boundary geometry of the training root portion 728, the processor 550 can be configured to define a second plurality of slices extending through the training 3D scan 700 along the second anatomical plane, as described above with respect to the first plurality of slices at step 606. Further, in a similar fashion, the processor 550 can be configured to: (i) identify respective second contour of the training root portion 728 of the given training tooth 715 in each slice of the second plurality of slices, thereby identifying therein portions of the second artefacts 1004; and (ii) aggregate the respective second contours to determine the second boundary geometry of the training root portion 728.

Figure 11B:
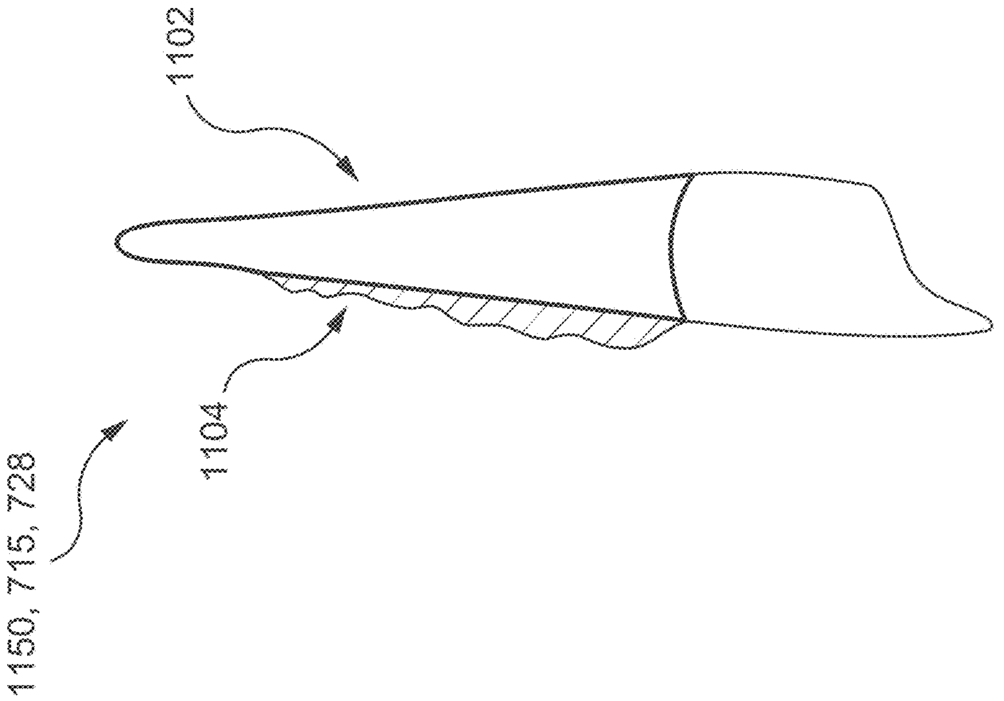
FIGS. 11A and 11B respectively depict (i) a second projection of one of the training 3D scan and the augmented 3D scan of FIGS. 7A and 8 to a third anatomical plane associated with the training subject and (ii) a third isolated view of the given training tooth in the third projection, in accordance with certain non-limiting embodiments of the present technology.
Figure 11A:
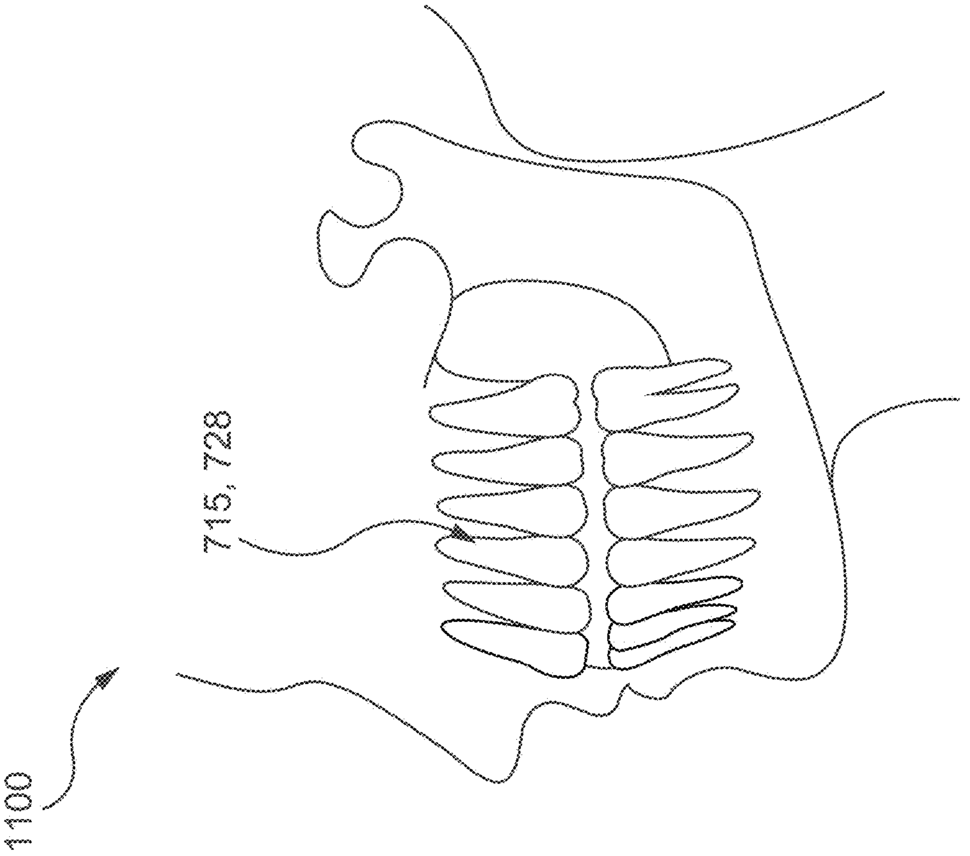

Further, in some non-limiting embodiments of the present technology, the processor 550 can be configured to identify a third boundary geometry of the training root portion 728 by determining a contour thereof in the third anatomical plane. With reference to FIGS. 11A and 11B, there is depicted a schematic diagram of a sagittal projection 1100 of the training 3D scan 700 and a third isolated view 1150 of the given training tooth 715 in the sagittal projection 1100, in accordance with certain non-limiting embodiments of the present technology.

More specifically, using the sagittal projection 1100 of the training 3D scan 700, the processor 550 can be configured to identify a third contour 1102 of the training root portion 728 in the third anatomical plane, thereby further identifying third image artefacts 1104. To do so, akin to identifying the respective first contour 902 and the second contour 1002, the processor 550 can be configured to use the 2D boundary identification model.

Further, using the third contour 1102 identified in the sagittal projection 1100 of the training 3D scan 700, the processor 550 can be configured to determine the third boundary geometry of the training root portion 728 in a 3D space.

Akin to determining the second boundary geometry of the training root portion, in some non-limiting embodiments of the present technology, instead of using the sagittal projection 1100 for determining the third boundary geometry of the training root portion 728, the processor 550 can be configured to define a third plurality of slices extending through the training 3D scan 700 along the third anatomical plane, as described in detail above with respect to the first plurality of slices at step 606. Further, in a similar fashion, the processor 550 can be configured to: (i) identify a respective third contour of the training root portion 728 of the given training tooth 715 in each slice of the third plurality of slices, thereby identifying therein portions of the third artefacts 1104; and (ii) aggregate the respective third contours to determine the third boundary geometry of the training root portion 728.

It should be expressly understood that although the above step is described with respect to determining boundary geometries of a single training root portion, that is, the training root portion 728 of the given training tooth 715, it is done so only for the purposes of clarity of the present disclosure. Thus, during the actual execution of the first method 600, boundary geometries of training root portions of at least some training teeth can be determined in concert, by applying steps 606 and 608 to an entirety of the training 3D scan 700. For example, the first boundary geometries of the respective training root portions of the training upper teeth 716 can be determined at the same time. Similarly, the second and third boundary geometries of the respective training root portions of at least some of the training upper teeth 716 and at least some of the training lower teeth 736 can also be determined at the same time.

After identifying the spatial boundary geometry of the respective training root portion of each one the training upper and lower teeth 716, 736 by determining the contours of the training root portions in at least two anatomical planes, the first method 600 hence advances to step 610 for identifying and removing the image artefacts.

Step 610: Analyzing a Combination of the First and Second Boundary Geometries of the Root Portion to Identify Artefacts Generated During at Least One of the First and Second Surface Boundary Identification Phases; Removing the Artefacts from the Combination of the First and Second Boundaries Geometries of the Root Portion to Generate a Final Boundary Geometry of the Root Portion of the Given Tooth At step 610, according to certain non-limiting embodiments of the present technology, the processor 550 can be configured to analyze the combination of the first and second boundary geometries to identify the image artefacts imposed on the training 3D scan 700.

For example, based on the so determined contours of the training root portion 728 of the given training tooth 715 in the first and second anatomical planes, the processor 550 can be configured to identify the first and second image artefacts 904, 1004 in each of the first plurality of slices defined through the training 3D scan 700. More specifically, the processor 550 can be configured to identify portions of the first image artefacts 904 in each one of the first plurality of slices extending through the training 3D scan 700 along the first anatomical plane, as imaging data located outside the respective first contour of the training root portion 728.

Further, by considering the second boundary geometry of the training root portion 728—and thus the geometry and location of the second image artefacts 1004 obtained during the second boundary identification phase—the processor 550 can be configured to more accurately identify the geometry and location of the second image artefacts 1004, which were previously fully visualized only in the second anatomical plane, within the first anatomical plane.

In some non-limiting embodiments of the present technology, in a similar manner, the processor 550 can further be configured to analyze the third boundary geometry of the training root portion 728—and hence the geometry and the location of the third image artefacts 1104 obtained during the determining the third contour 1102 of the training root portion 728—to more accurately identify the geometry and location of the third image artefacts 1104 in each one of the first plurality of slices defined along the first anatomical plane.

Further, once the processor 550 has identified the geometry and the location of the first image artefacts 904, the second image artefacts 1004, and/or the third image artefacts 1104 in each slice of the first plurality of slices, the processor 550 can be configured to remove these artefacts from each slice of the first plurality of slices, thereby generating a plurality of augmented slices. By doing so, the processor 550 is configured to identify a final boundary geometry of the training tooth portion 728 that is free of the first, second, and/or third image artefacts 904, 1004, 1104.

The first method 600 hence advances to step 612.

Step 612: Segmenting, in the 3D Scan, the Root Portion of the Given Tooth Along the Generated Final Boundary Geometry At step 612, according to certain non-limiting embodiments of the present technology, the processor 550 can be configured to segment, in each one of the plurality of augmented slices, contours of the training root portions of the training upper and training lower teeth 716, 736. By doing so, the processor 550 can be configured to segment the training upper and training lower teeth 716, 736 from the training 3D scan 700 along their respective final boundary geometries determined at step 610.

Figure 12:
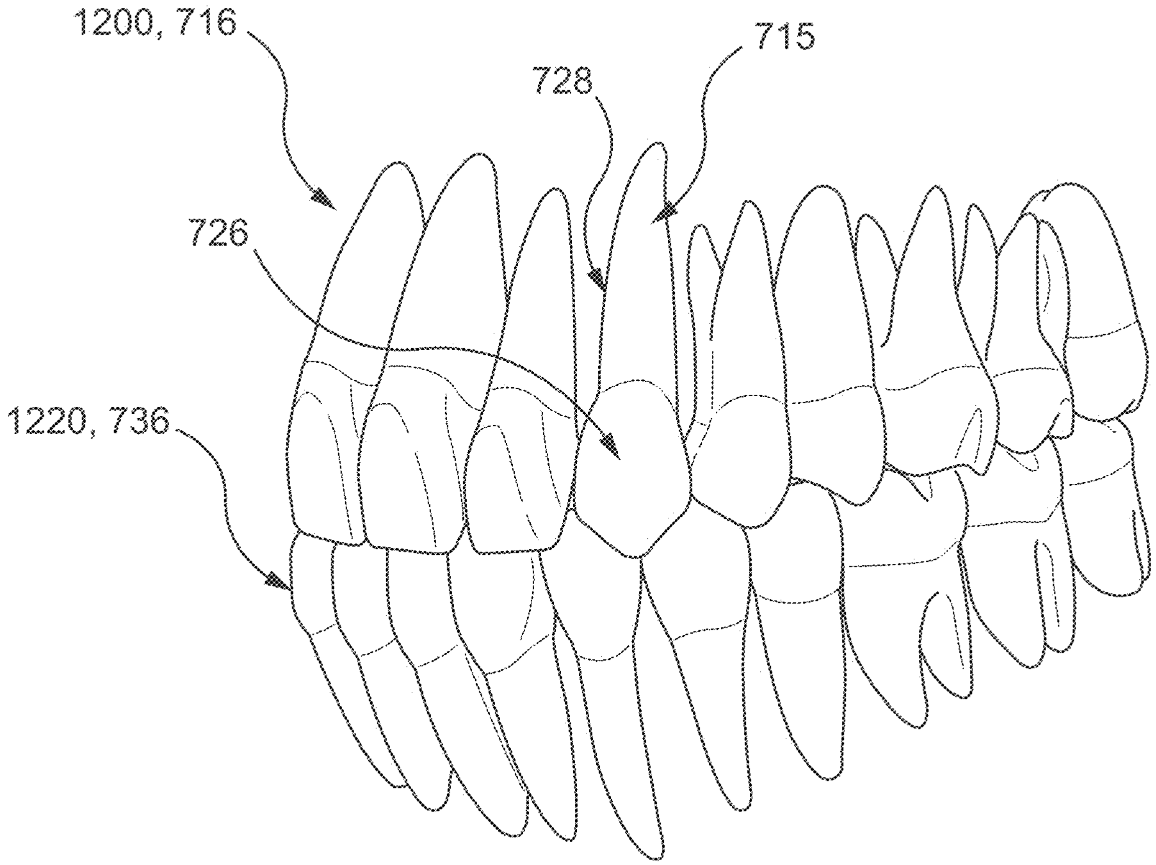
FIG. 12 depicts a schematic diagram of training arch forms of the training subject, segmented from one of the of the training 3D scan and the augmented 3D scan of FIGS. 7A and 8, in accordance with certain non-limiting embodiments of the present technology.

By doing so, the processor 550 can be configured to generate (1) an augmented training upper arch form 3D model 1200, representative of the training upper teeth 716, and (2) an augmented training lower arch form 3D model 1250, representative of the training lower teeth 736, both of which are schematically depicted in FIG. 12, in accordance with certain non-limiting embodiments of the present technology.

As it can be appreciated from FIG. 12, in the augmented training upper arch form 3D model 1200, the training root portion 728 of the given training tooth 715 is free of image artefacts therefore having a more anatomically accurate shape. Thus, this representation of the training root portion 728 can be used for more accurate modelling of tooth movements, which can translate in a more effective orthodontic treatment.

Also, although the above steps of the present methods are explained using the training 3D scan 700, it should be expressly understood that it is done so solely for the clarity of the present description. In other non-limiting embodiments of the present technology, as mentioned above with respect to step 602, the processor 550 could generate, based on the training 3D imaging data, the augmented training 3D scan 800, and apply mutatis mutandis thereto steps 604 to 612, thereby generating the augmented training upper arch form 3D model 1200 and the augmented training lower arch form 3D model 1220 that, aside from the training portions free of image artefacts, would also include anatomically accurate representations of the training crown portions.

In some non-limiting embodiments of the present technology, instead of generating the training data for training the MLA 450, the processor 550 can be configured to execute steps 602 to 610 for direct segmentation of in-use teeth within an in-use arch form, such as the upper teeth 16 of the upper arch form 20. More specifically, in these embodiments, the processor 550 can be configured to: (i) receive, from the imaging device 430, in-use 3D imaging data representative of the upper arch form 20 as described above with respect to the training 3D imaging data at step 602; (ii) similar to the training 3D scan 700 mentioned further above with reference to FIGS. 7A, generate an in-use 3D scan (not depicted) representative of the upper arch form 20; (iii) define a plurality of in-use slices through the in-use 3D scan along the first anatomical plane associated with the subject and generate a projection of the in-use 3D scan to at least one of the second and third anatomical planes; (iv) identify, in the in-use 3D scan, in-use geometries of each root portion of the upper teeth 16, such as the root portion 28 of the given tooth 15 mentioned above as mentioned above with reference to FIGS. 9A, 9B, 10A, 10B, 11A, and 11B; and (v) based on the identified in-use geometries, identify and remove in-use image artefacts imposed to the in-use 3D scan by the imaging device 430; and (vi) segment the root portion 28 from each in-use slice of the plurality of in-use slices.

Needless to say, in some non-limiting embodiments of the present technology, instead of the in-use 3D scan, the processor 550 can be configured to generate an augmented in-use 3D scan (not depicted) that would be similar to the augmented training 3D scan 800 described above with reference to FIG. 8 and include more anatomically accurate, free of possible image artefacts, digital representations of the crown portions of the upper teeth 16, such as the crown portion 26 of the given tooth 15. The processor 550 can be configured to generate these digital representations as part of a respective in-use 3D digital model (not depicted) generated using intra-oral scanning techniques as mentioned above with reference to FIG. 7B. After, as described in detail further above, the processor 550 can be configured to merge the digital representations of the crown portions of the upper teeth 16 in the in-use 3D scan and the respective in-use 3D digital model to generate the augmented in-use 3D scan associated with the subject, similar to the augmented training 3D scan 800 associated with the training subject.

Figure 13:
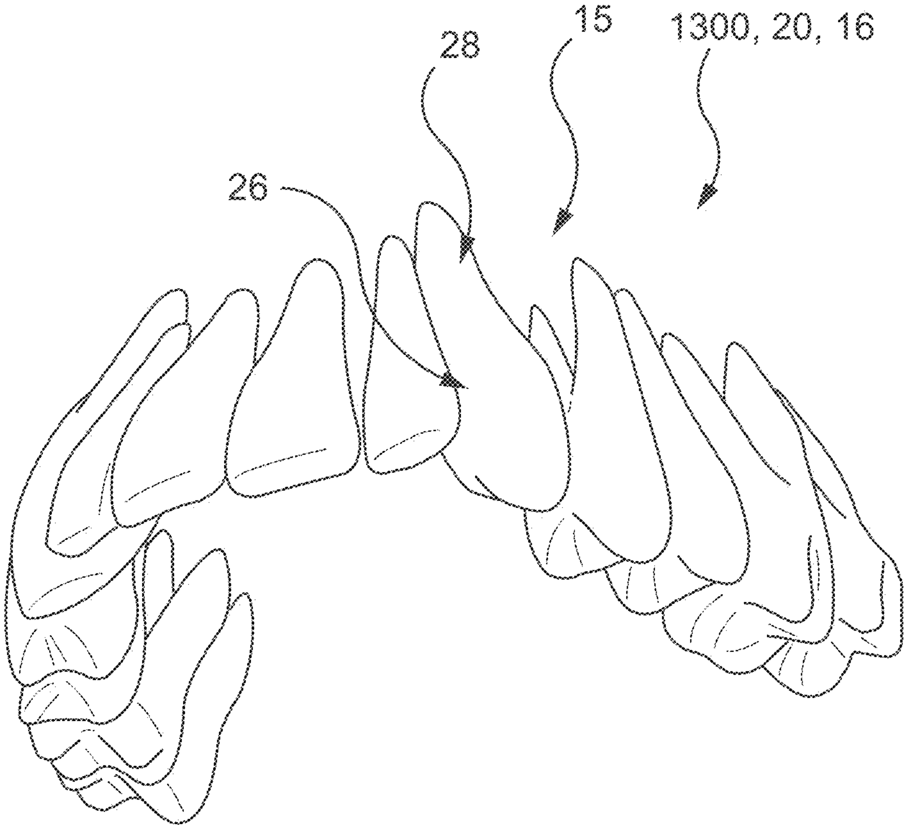
FIG. 13 depicts an augmented 3D digital model of the plurality of teeth of the subject of FIG. 1, segmented from the associated 3D imaging data, using the trained MLA, in accordance with certain non-limiting embodiments of the present technology.

By doing so, the processor 550 can be configured to generate an augmented upper arch form 3D digital model 1300, schematically depicted in FIG. 13, in accordance with certain non-limiting embodiments of the present technology. Depending on whether the processor 550 uses the in-use 3D scan or the augmented in-use 3D scan representative of the upper arch form 20, the augmented upper arch form 3D digital model 1300 can be representative of only the root portions of the upper teeth 16 or both the crown portions and the root portions of the upper teeth 16. The processor 550 can further be configured to store the augmented upper arch form 3D digital model 1300, for example, in the solid-state drive 560 of the system 400. Further, the processor 550 can be configured to use the augmented upper arch form 3D digital model 1300 in modelling the tooth movements of the upper teeth 16 in the course of the planned orthodontic treatment. Further, based on the planned tooth movements, the processor 550 can be configured to cause manufacture of one or more configurations of the orthodontic appliance 10, as described in detail above with reference to FIGS. 1 to 3. Needless to say, a similar augmented arch form 3D digital model can be generated for the lower teeth of the subject for further planning the orthodontic treatment thereof.

The first method 600 hence advances to step 614.

Step 614: Storing Data of the Segmented Root Portion for Further Use in Training the MLA In those non-limiting embodiments of the present technology where the processor 550 generates the training data for training the MLA 450 for identifying the in-use teeth in the in-use 3D imaging data, at step 614, the processor 550 can be configured to store the plurality of augmented slices representative of the augmented training upper arch form 3D model 1200 and the augmented training lower arch form 3D model 1220 in the solid-state drive 560 for further use in training the MLA 450.

Thus, by executing steps 602 to 614, the processor 550 can be configured to generate similar augmented slices representative of segmented training teeth of other training subjects and generate a training data set for training the MLA 450.

More specifically, according to certain non-limiting embodiments of the present technology, the training data set can include a plurality of training digital objects, a given one of which includes a training contour of the training root portion 728 or the training crown portion 726 in a respective augmented slice of the plurality of augmented slices, representative of the final boundary geometry of the training root portion 728. As it can be appreciated, the training contour of the training root portion 728, corresponding to the final boundary geometry thereof, is a label used for a supervised approach of training the MLA 450.

Further, the processor 550 can be configured to train the MLA 450 using the training data set. More specifically, during the training of the MLA 450, the processor 550 is configured to: (i) feed the given training digital object to the MLA 450, thereby causing the MLA 450 to identify an intermediate contour of the training root portion 728 in the respective augmented slice; (ii) determine a difference between the intermediate contour and the training contour associated with the given training digital object; and (iii) minimize the difference between the intermediate and training contour, thereby training the MLA 450 to identify the root portions of the in-use teeth of subjects in the associated 3D imaging data. In some non-limiting embodiments of the present technology, the difference between the intermediate contour and the training contour (label) can be expressed by a loss function, which can comprise one of a Dice loss function, a binary cross-entropy loss function, and a Hausdorff distance loss function, as an example.

As it can be appreciated, the training data set can include thousands, tens of thousands, or event hundred of thousands training digital objects. Thus, by iteratively adjusting internal parameters of the MLA 450 based on the calculated values of the loss function, representative of the difference between intermediate contours predicted by the MLA 450 and corresponding training contours included in the training data set, the processor 550 can be configured to train the MLA 450 for identifying in-use teeth in the in-use 3D imaging data.

As it can be appreciated, in those embodiments where at step 602 the processor generated the training augmented 3D scan 800 for further segmenting therewithin entire representations of training teeth, the given training digital object can include the respective augmented representative of the training crown portion 726. Accordingly, in these embodiments, in a similar manner, the processor 550 could be configured to train the MLA 450 to identify and segment entire representations of the in-use teeth.

The first method 600 hence terminates.

Figure 14:
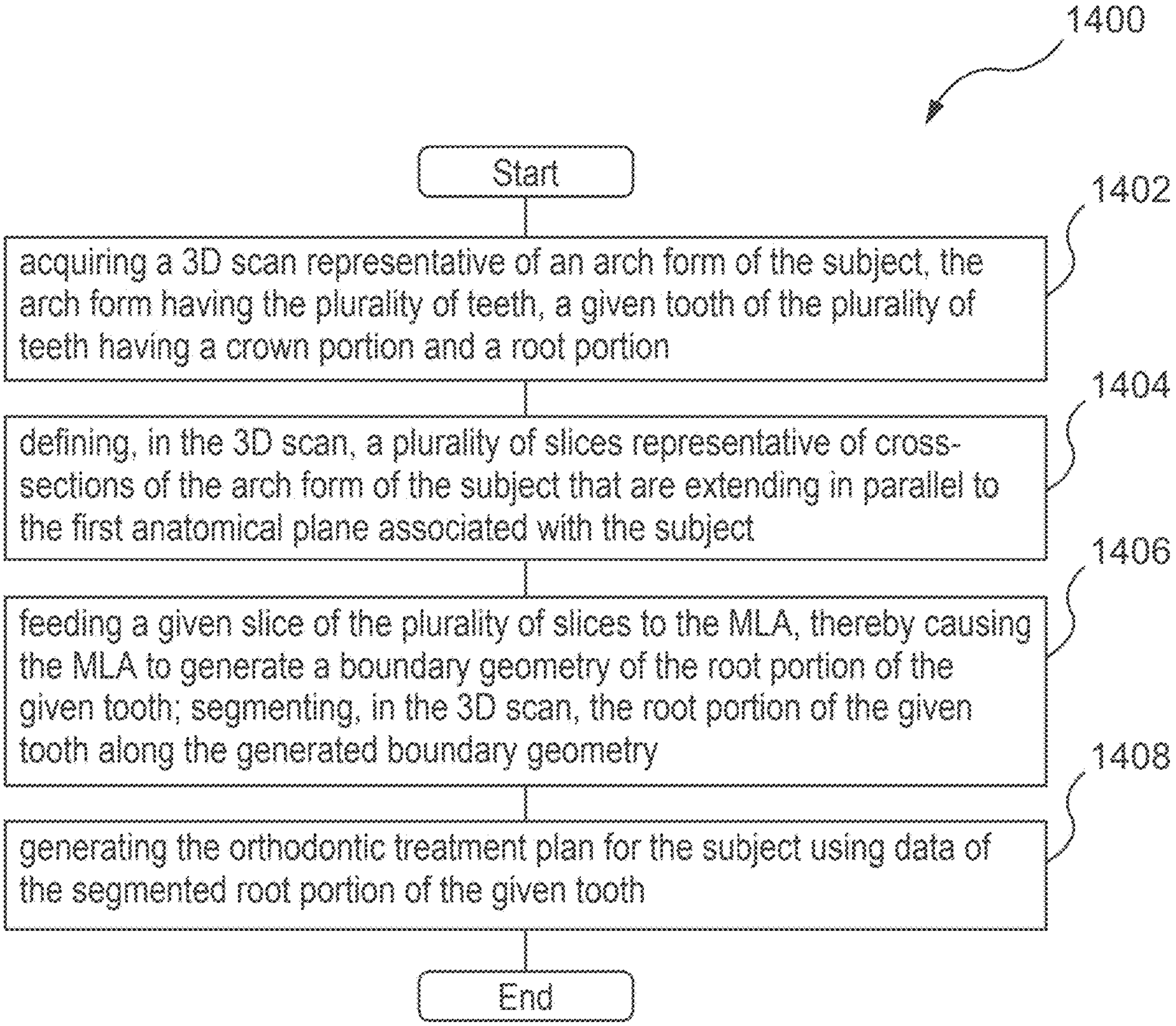
FIG. 14 depicts a flowchart diagram of a second method for using the MLA for identifying the plurality of teeth of the subject of FIG. 1 in the 3D imaging data, in accordance with certain non-limiting embodiments of the present technology.

After the processor 550 has trained the MLA 450 to identify the in-use teeth of subjects in the in-use 3D imaging data, the processor 550 can be configured to execute the in-use process of the trained MLA 450. With reference to FIG. 14, there is depicted a flowchart diagram of a second method 1400 of the in-use process of the MLA 450, in accordance with certain non-limiting embodiments of the present technology. For example, the second method 1400 can be executed by the processor 550 of the system 400.

Step 1402: Acquiring a 3D Scan Representative of an Arch Form of the Subject, the Arch Form Having the Plurality of Teeth, a Given Tooth of the Plurality of Teeth Having a Crown Portion and a Root Portion The second method 1400 commences at step 1402 with the processor 550 being configured to acquire the in-use 3D imaging data representative of an in-use arch form of a given subject, such as the upper arch form 20 of the subject. Similar to the training 3D imaging data, the in-use 3D imaging data can be generated by the imaging device 430 and include a plurality of in-use slices defined along the first anatomical plane associated with the subject.

Depending on whether the MLA 450 has been trained to identify only the in-use root portions or entire in-use teeth, the processor 550 can further be configured to generate either (1) the in-use 3D scan (not depicted) representative of the upper arch form 20, which would be similar to the training 3D scan 700, generation of which is described above with reference to FIG. 7A; or (2) the augmented in-use 3D scan (not depicted) of the upper arch form 20, similar to the augmented training 3D scan 800, generation of which is described above with reference to FIGS. 7B and 8.

The second method 1400 hence advances to step 1404.

Step 1404: Defining, in the 3D Scan, a Plurality of Slices Representative of Cross-Sections of the Arch Form of the Subject that are Extending in Parallel to the First Anatomical Plane Associated with the Subject At step 1402, the processor 550 can be configured to define a plurality of in-use slices through a given one of the in-use or augmented in-use 3D scans associated with the upper arch form 20 along with the first anatomical plane associated with the subject. In those embodiments where the imaging device 430 used for generating the in-use 3D imaging data is a CT-based imaging device, similar to the training 3D scan 700 and the augmented training 3D scan 800, the processor 550 can be configured to define the plurality of in-use slices to correspond to the slices generated by the imaging device 430. However, in other non-limiting embodiments of the present technology, the processor 550 can be configured to define the plurality of in-use slices that would be different from those generated by the imaging device 430, as described in detail above.

The second method 1400 hence advances to step 1406.

Step 1406: Feeding a Given Slice of the Plurality of Slices to the MLA, Thereby Causing the MLA to Generate a Boundary Geometry of the Root Portion of the Given Tooth; Segmenting, in the 3D Scan, the Root Portion of the Given Tooth Along the Generated Boundary Geometry At step 1406, according to certain non-limiting embodiments of the present technology, the processor 550 can be configured to feed each one of the plurality of in-use slices to the MLA 450 trained according to the first method 600. By doing so, the processor 550 causes the MLA 450 to identify, in a given in-use slice of the plurality of in-use slices, a respective contour of the given tooth 15 in the first anatomical plane. The identified contour would be free of possible image artefacts imposed by the imaging device 430 during the generation of the in-use 3D imaging data. In other words, using the MLA 450 trained in accordance with the first method 600 described herein may enable identifying, in the plurality of in-use slices extending along the first anatomical plane, image artifacts visualizable in the first, second, and third anatomical planes, which may allow obtaining more accurate representations of the root portions of the upper teeth 16 consuming less computational resources compared to the prior art approaches.

The respective contours of the given tooth 15 in each one of the plurality of in-use slices will thus define an in-use boundary geometry of the root portion 28 and/or the crown portion 26 of the given tooth 15. Further, according to certain non-limiting embodiments of the present technology, based on the identified respective contours of the given tooth 15 in each one of the plurality of in-use slices, the processor 550 can be configured to restore the augmented upper arch form 3D digital model 1300, which can be used for developing the orthodontic treatment.

In those embodiments where the processor 550 utilized the in-use 3D scan for segmenting only the root portions of the upper teeth 16, the processor 550 can further be configured to merge the augmented upper arch form 3D digital model 1300 with the respective in-use 3D digital model of the upper arch form 20, as described in detail above with respect to the augmented training 3D scan 800, for providing more anatomically accurate digital representations of the crown portions of the upper teeth 16.

The second method hence advances to step 1408.

Step 1408: Generating the Orthodontic Treatment Plan for the Subject Using Data of the Segmented Root Portion of the Given Tooth At step 1408, using the augmented upper arch form 3D digital model 1300 of the upper teeth, the processor 550 can be configured to generate an orthodontic treatment for the subject. To do so, first, the processor 550 can be configured to model the tooth movements of the upper teeth 16 in the course of the planned treatment from their initial positions to their target positions, associated with their alignment within the upper arch form 20.

Further, based on the modelled tooth movements, the processor 550 can be configured to determine forces to be applied to the given tooth 15 in the course of the orthodontic treatment to cause the given tooth 15 to make the planned tooth movements towards a respective target position. It is not limited how the processor 550 is configured to calculate the forces to be applied to the given tooth 15. In some non-limiting embodiments of the present technology, the processor 550 can be determine the forces in accordance with one or more approaches described in U.S. Pat. No. 10,993,782-B1 referenced above. More specifically, in these embodiments, the processor 550 can be configured for: (i) identifying a 3D model (not separately numbered in FIG. 13) of the given tooth 15 from the augmented upper arch form 3D digital model 1300; (ii) acquiring a stress values range for stress applicable to the given tooth 15 for causing the given tooth 15 to move from the initial position to the target position, the stress values range including: a minimum stress value being indicative of a minimum amount of stress for causing the given tooth 15 to move; a maximum stress value being indicative of a minimum amount of stress causing permanent damage to the given tooth 15; (iii) generating, based on the 3D model of the given tooth 15, a plurality of segments defining the tooth trajectory of the given tooth 15 from the initial position to the target position, a given segment of the plurality of segments being associated with a start position and with an end position, the given segment of the plurality of segments having been generated by executing an optimization algorithm, the executing comprising: identifying the start position associated with the given segment; applying an initial force to the 3D model of the given tooth 15, the initial force causing a first maximum displacement, in a predetermined interval, of the 3D model of the given tooth 15 from the start position associated with the given segment towards the target position associated with the given tooth 15; determining, from the first maximum displacement, if there is an occurrence of a collision between the 3D model of the given tooth 15 and a 3D model of at least one adjacent tooth, the collision being caused by applying the initial force; in response to determining that there is the occurrence of the collision, iteratively optimizing, based on the stress values range, the initial force, until: a second maximum displacement of the 3D model of the given tooth 15 is caused, by an optimized initial force, in the predetermined interval, from the start position associated with the given segment towards the target position associated with the given tooth 15 provided that an extent of the collision between the 3D model of the given tooth 15 and the 3D model of the at least one adjacent tooth is minimized; and determining the optimized initial force as being a valid force to be applied to the given tooth 15, thereby identifying the end position associated with the given segment.

Further, based on the determined forces, the processor 550 can be configured to determine the orthodontic treatment for the subject and/or cause manufacture of at least one configuration of the orthodontic appliance 10 mentioned above. More specifically, in those embodiments where the orthodontic appliance 10 comprises the brackets 12 and the archwire 14, as depicted in FIGS. 1 to 3, based on the determined forces to be applied to each one of the upper teeth 16, the processor 550 can be configured to determine and/or select: (1) parameters of the archwire 14, including a material, a shape of a cross-section, and an elastic modulus, for example; and (2) parameters of each of the brackets 12, including a type and an a slot size, a torque prescription, and a position within the surface of the given tooth 15, to name a few.

In those embodiments where the orthodontic appliance 10 is an orthodontic aligner, the processor 550 can be configured to cause the manufacturing system 440 to produce at least one configuration of the orthodontic aligner, for example, in accordance with methods described in U.S. patent application Ser. No. 19/243,375 referenced above.

The second method 1400 hence terminates.

Thus, certain non-limiting embodiments of the present methods may allow segmenting subjects' teeth in 3D imaging data of various modalities, identifying and removing image artefacts using less computational resources compared to 3D segmentations approaches described in the prior art without loss in anatomical accuracy of the resulting segmented teeth. Also, using the MLA 450 trained in accordance with the first method 600 may allow automation of the segmentation process of the in-use teeth within the in-use 3D scan, by identifying and removing image artefacts surrounding the in-use teeth. More specifically, the trained MLA 450 can be used to identify and remove these artefacts from in-use slices extending across the in-use 3D scan along one anatomical plane; even though the artefacts are more are clearly visualizable in other anatomical planes associated with the given subject.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for training a machine-learning algorithm (MLA) for identifying a subject's teeth in imaging data associated with the subject, the method comprising:

generating a training data set, by:

acquiring a 3D scan of a training arch form of a training subject, the training arch form having a plurality of teeth, a given tooth of the plurality of teeth having a crown portion and a root portion;

defining, in the 3D scan, a plurality of slices representative of cross-sections of the training arch form that are extending in parallel to a first anatomical plane associated with the training subject;

identifying, during a first surface boundary identification phase, a first boundary geometry of the root portion of the given tooth by determining, using the plurality of slices of the 3D scan, a contour of each cross-section of the root portion in the first anatomical plane associated with the training subject;

identifying, during a second surface boundary identification phase, following the first surface boundary identification phase, a second boundary geometry of the root portion of the given tooth by determining a contour of the root portion in a projection of the root portion to at least one of a second and a third anatomical planes associated with the training subject;

analyzing a combination of the first and second boundary geometries of the root portion to identify artefacts generated during at least one of the first and second surface boundary identification phases;

removing the artefacts from the combination of the first and second boundary geometries of the root portion to generate a final boundary geometry of the root portion of the given tooth;

segmenting, in the 3D scan, the root portion of the given tooth along the generated final boundary geometry; and storing data of the segmented root portion for further use in training the MLA, the training comprising:

generating a plurality of training digital objects, a given training digital object of which comprises a respective slice of the plurality of slices of the 3D scan including the root portion of the given tooth with the final boundary geometry applied thereon;

feeding the given training digital object to the MLA, thereby causing the MLA to generate an intermediate boundary geometry around the root portion of the given tooth in the respective slice of the 3D scan; and minimizing a difference between the intermediate boundary geometry and the final boundary geometry, thereby causing the MLA to generate an in-use boundary geometry around the root portion of a given in-use tooth within a given in-use slice of an in-use 3D scan.

2. The method of claim 1, wherein the identifying each one of the first and second boundary geometries comprises applying a 2D boundary identification model.

3. The method of claim 2, wherein the 2D boundary identification model is a numeric 2D boundary identification model.

4. The method of claim 1, wherein prior to the identifying the first boundary geometry, the method comprises:

acquiring a 3D digital model comprising a plurality of mesh elements defining a surface of crown portions of the plurality of teeth of the training subject;

merging the 3D digital model with the 3D scan to generate an augmented 3D scan of the plurality of teeth;

defining, in the augmented 3D scan, an other plurality of slices representative of cross-sections of the training arch form that are extending in parallel to the first anatomical plane associated with the training subject; and wherein:

the identifying, during the first surface boundary identification phase, the first boundary geometry comprises identifying a third boundary geometry of the crown and root portions of the given tooth by determining, using the other plurality of slices of the augmented 3D scan, a contour of each cross-section of the given tooth in the first anatomical plane associated with the training subject;

the identifying, during the second surface boundary identification phase, following the first surface boundary identification phase, the second boundary geometry comprises identifying a fourth boundary geometry of the crown and root portions of the given tooth by determining, using the other plurality of slices of the augmented 3D scan, a contour of each cross-section of the given tooth in the at least one of the second and the third anatomical plane associated with the training subject, the analyzing comprises analyzing a combination of the third and fourth boundary geometries of the given tooth to identify artefacts generated during at least one of the first and second surface boundary identification phases;

the removing comprises removing artefacts from the combination of the third and fourth boundary geometries of the given tooth to generate a second final boundary geometry of the given tooth;

the segmenting comprises segmenting, in the augmented 3D scan, the given tooth along the generated second final boundary geometry; and the storing comprises storing data of the segmented given tooth for further use in training the MLA.

5. The method of claim 4, wherein the merging comprises applying an Iterative Closest Point (ICP) algorithm.

6. The method of claim 1, wherein the first anatomical plane is a transverse anatomical plane, the second anatomical plane is a sagittal anatomical plane, and the third anatomical plane is a coronal anatomical plane.

7. The method of claim 1, wherein the MLA is a Convolutional Neural Network (CNN)-based MLA.

8. The method of claim 1, further comprising:

training the MLA using the data of the segmented root portion;

using the trained MLA to identify the subject's teeth in the imaging data; and generating, based on the identified subject's teeth, an orthodontic treatment for the subject.

9. The method of claim 1, wherein the minimizing the difference comprises minimizing a respective value of a loss function.

10. The method of claim 1, further comprising using the trained MLA for generating the in-use boundary geometry around the given in-use tooth in the imaging data, the using comprising:

acquiring the in-use 3D scan of an in-use arch form of the subject, the in-use arch form having a plurality of in-use teeth including the given in-use tooth;

defining, in the in-use 3D scan, a plurality of in-use slices, including the given in-use slice, representative of cross-sections that are extending in parallel to the first anatomical plane associated with the training subject;

feeding the given in-use slice of the plurality of in-use slices to the MLA, thereby causing the MLA to generate the in-use boundary geometry of the root portion of the given in-use tooth;

segmenting, in the in-use 3D scan, the root portion of the given in-use tooth along the generated in-use boundary geometry; and storing data of the segmented root portion of the given in-use tooth for further use in determining an orthodontic treatment for the subject.

11. The method of claim 1, wherein the 3D scan is a 3D radiographic scan.

12. A method for developing an orthodontic treatment plan for a subject using a machine-learning algorithm (MLA), the MLA having been trained to identify root portions of a plurality of teeth of the subject based on a training data set, which has been generated by:

acquiring training slices of a training 3D scan representative of cross-sections of a training arch form of a training subject that are extending in parallel to a first anatomical plane associated with the training subject, the training arch form having a plurality of training teeth, a given training tooth of the plurality of training teeth having a training crown portion and a training root portion; and analyzing boundary geometries of the training root portion of the given training tooth in (i) the first anatomical plane and (ii) at least one of a second anatomical plane and a third anatomical plane associated with the training subject to identify and remove image artefacts;

the method comprising:

acquiring a 3D scan representative of an arch form of the subject, the arch form having the plurality of teeth, a given tooth of the plurality of teeth having a crown portion and a root portion;

defining, in the 3D scan, a plurality of slices representative of cross-sections of the arch form of the subject that are extending in parallel to the first anatomical plane associated with the subject;

feeding a given slice of the plurality of slices to the MLA, thereby causing the MLA to generate a boundary geometry of the root portion of the given tooth;

segmenting, in the 3D scan, the root portion of the given tooth along the generated boundary geometry; and generating the orthodontic treatment plan for the subject using data of the segmented root portion of the given tooth, the generating the orthodontic treatment plan comprising determining, based on the segmented root portion of the given tooth, at least one configuration of an orthodontic appliance to be applied to the plurality of teeth of the subject.

13. The method of claim 12, wherein the analyzing comprises:

identifying, during a first surface boundary identification phase, a first boundary geometry of the training root portion of the given training tooth by determining, using the training slices of the training 3D scan, a contour of each cross-section of the training root portion in the first anatomical plane associated with the training subject;

identifying, during a second surface boundary identification phase, following the first surface boundary identification phase, a second boundary geometry of the training root portion of the given training tooth by determining a contour of the training root portion in a projection of the training root portion to the at least one of the second and the third anatomical plane associated with the training subject; and analyzing a combination of the first and second boundary geometries of the training root portion to identify and remove artefacts generated during at least one of the first and second surface boundary identification phases.

14. The method of claim 12, wherein the 3D scan is a 3D radiographic scan.

15. A method for developing an orthodontic treatment for a subject, the method comprising:

acquiring a 3D scan of an arch form of the subject, the arch form having a plurality of teeth, a given tooth of the plurality of teeth having a crown portion and a root portion;

defining, in the 3D scan, a plurality of slices representative of cross-sections of the arch form that are extending in parallel to a first anatomical plane associated with the subject;

identifying, during a first surface boundary identification phase, a first boundary geometry of the root portion of the given tooth by determining, using the plurality of slices of the 3D scan, a contour of each cross-section of the root portion in the first anatomical plane associated with the subject;

identifying, during a second surface boundary identification phase, following the first surface boundary identification phase, a second boundary geometry of the root portion of the given tooth by determining a contour of the root portion in a projection of the root portion to at least one of a second and a third anatomical planes associated with the subject;

analyzing a combination of the first and second boundary geometries of the root portion to identify artefacts generated during at least one of the first and second surface boundary identification phases;

removing the artefacts from the combination of the first and second boundary geometries of the root portion to generate a final boundary geometry of the root portion of the given tooth;

segmenting, in the 3D scan, the root portion of the given tooth along the generated final boundary geometry; and generating the orthodontic treatment for the subject using data of the segmented root portion of the given tooth, the generating the orthodontic treatment comprises determining, based on the segmented root portion of the given tooth, at least one configuration of an orthodontic appliance to be applied to the plurality of teeth of the subject.

16. The method of claim 15, wherein the identifying each one of the first and second boundary geometries comprises applying a 2D boundary identification model.

17. The method of claim 16, wherein the 2D boundary identification model is a numeric 2D boundary identification model.

* * * * *